United States Patent
Kawana et al.

(10) Patent No.: US 7,006,172 B2
(45) Date of Patent: Feb. 28, 2006

(54) COLOR LIQUID CRYSTAL DISPLAY DEVICES

(75) Inventors: Shin Kawana, Yokohama (JP); Naoki Sako, Yokohama (JP); Naoto Kijima, Yokohama (JP); Takayuki Hisamune, Odawara (JP); Reiji Ootsuka, Odawara (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/856,803

(22) Filed: Jun. 1, 2004

(65) Prior Publication Data
US 2004/0218115 A1 Nov. 4, 2004

Related U.S. Application Data

(63) Continuation of application No. PCT/JP03/11085, filed on Aug. 29, 2003.

(30) Foreign Application Priority Data

| Aug. 30, 2002 | (JP) | ............................. 2002-254705 |
| Oct. 22, 2002 | (JP) | ............................. 2002-307300 |

(51) Int. Cl.
*G02F 1/13357* (2006.01)

(52) U.S. Cl. ........................................ 349/71; 349/106

(58) Field of Classification Search ................. 349/61, 349/69, 70, 71, 106; 313/499, 500, 501, 313/502, 503; 362/26, 31
See application file for complete search history.

(56) References Cited

U.S. PATENT DOCUMENTS

| 2001/0048560 A1 | 12/2001 | Sugano |
| 2002/0126078 A1 | 9/2002 | Horibe et al. |

FOREIGN PATENT DOCUMENTS

| EP | 1160883 | 12/2001 |
| JP | 7-128519 | 5/1995 |
| JP | 9-97017 | 4/1997 |
| JP | 11-14985 | 1/1999 |
| JP | 11-352500 | 12/1999 |
| JP | 2001-222904 | 8/2001 |
| JP | 2001-228319 | 8/2001 |
| JP | 2001-343706 | 12/2001 |
| JP | 2002-57376 | 2/2002 |
| JP | 2002-105447 | 4/2002 |

OTHER PUBLICATIONS

The Chemical Daily, p. 29, "DNP: More Activity in High Definition and Low Cost Color Filters for LCD TVS", Feb. 6, 2003 (with English translation).

*Primary Examiner*—Hung T. Nguyen
*Assistant Examiner*—Tai Duong
(74) *Attorney, Agent, or Firm*—Oblon, Spivak, McClelland, Maier & Neustadt, P.C.

(57) ABSTRACT

The invention relates to a color liquid crystal display device with a combination of light shutters that utilize a liquid crystal, a color filter having color elements of at least three colors of red, green and blue corresponding to the light shutters, and a backlight for transmission illumination.

9 Claims, 5 Drawing Sheets

COLOR LIQUID CRYSTAL DISPLAY DEVICES

This application is a continuation of PCT/JP03/11085, filed on Aug. 29, 2003, which claims priority to JP 2002-254705, filed on Aug. 30, 2002, and JP 2002-307300, filed on Oct. 22, 2002.

TECHNICAL FIELD

The first invention of the present application relates to a color liquid crystal display device and, particularly, to a color liquid crystal display device comprising a combination of light shutters utilizing a liquid crystal, a color filter having color elements of at least three colors of red, green and blue corresponding to the light shutters, and a backlight for transmission illumination, wherein emission wavelengths of the backlight are improved and wherein the transmittance of the color filter, particularly the spectral transmittance of green pixels of the color filter, is adjusted corresponding to the emission wavelengths of the backlight, so as to realize the green pixels with high chromatic purity and thereby accomplish reproduction of a deep green image, thereby achieving the high chromatic purity of NTSC percentage of at least 80% or even at least 90%. The present invention also relates to a photosensitive color resin composition suitable for formation of the green pixels in the color liquid crystal display device as described above, and to a color filter in which the green pixels are formed using the resin composition.

The second invention of the present application also relates to a color liquid crystal display device and, particularly, to a color liquid crystal display device comprising a combination of light shutters utilizing a liquid crystal, a color filter having color elements of at least three colors of red, green and blue corresponding to the light shutters, and a backlight for transmission illumination, wherein emission wavelengths of the backlight are improved and wherein the transmittance of the color filter, particularly the spectral transmittance of red pixels of the color filter, is adjusted corresponding to the emission wavelengths of the backlight, so as to realize the red pixels with high chromatic purity and thereby accomplish reproduction of a deep red image, thereby expanding a color reproduction range and achieving the high chromatic purity of NTSC percentage of at least 70% or even at least 80%.

BACKGROUND ART

In recent years, the liquid crystal display elements are expected not only in the conventional application to personal computer monitors but also in application to ordinary color televisions. The color reproduction range of the color liquid crystal display elements is determined by colors of light emitted from the red, green and blue pixels and, where chromaticity points of the respective color pixels in the CIE XYZ colorimetric system are represented by $(x_R, y_R)$, $(x_G, y_G)$ and $(x_B, y_B)$, the color reproduction range is defined by an area of a triangle surrounded by these three points on an x–y chromaticity diagram. Namely, the larger the area of this triangle, the more vivid color image the display elements reproduce. The area of this triangle is normally expressed using a ratio of the area of the triangle to an area of a reference triangle formed by three points of the three primary colors, red (0.67, 0.33), green (0.21, 0.71) and blue (0.14, 0.08), in the standard system defined by U.S. National Television System Committee (NTSC) (in unit of %, which will be referred to hereinafter as "NTSC percentage"). The ordinary notebook computers have the values of approximately 40 to 50%, the desktop computer monitors the values of 50 to 60%, and the existing liquid crystal TVs the values of approximately 70%.

A color liquid crystal display device utilizing such color liquid crystal display elements is mainly composed of light shutters utilizing a liquid crystal, a color filter having red, green and blue pixels, and a backlight for transmission illumination, and the colors of light emitted from the red, green and blue pixels are determined by the emission wavelengths of the backlight and the spectral curve of the color filter.

The backlight generally used is one using as a light source a cold-cathode tube with emission wavelengths in the red, green and blue wavelength regions and using a light guide plate for converting light emitted from this cold-cathode tube, into white area light source. Among illuminants of the cold-cathode tube, the red illuminant is made from an $Y_2O_3$:Eu type phosphor, the green illuminant from a $LaPO_4$:Ce,Tb type phosphor, and the blue illuminant from a $BaMgAl_{10}O_{17}$:Eu type phosphor or an $Sr_{10}(PO_4)_6Cl_2$:Eu type phosphor, as a typical example. A fluorescent lamp is used as a light source for the backlight in structure in which the electrodes are mounted in a sealed package provided with a phosphor film formed from a mixture of these phosphors at an appropriated compounding ratio in consideration of the white balance and in which the interior is filled with a rare gas.

Another backlight uses a substrate provided with a phosphor layer, and a cathode tube or an LED to emit ultraviolet, blue or deep blue light, and is configured to excite the phosphors by light therefrom and use their luminescence as a white area light source.

In the color liquid crystal display elements, the color filter extracts only wavelengths in necessary regions from the emission distribution of the backlight as described above, to provide the red, green and blue pixels.

Methods for production of this color filter proposed heretofore include such methods as dyeing, pigment dispersion, electrodeposition, printing, and so on. The colorants for coloring used to be dyes, but are now pigments in terms of reliability and durability as liquid crystal display elements. Accordingly, the pigment dispersion is most commonly used as a method for production of the color filter at present in terms of productivity and performance. In general, in use of an identical colorant, the NTSC percentage and brightness are in a trade-off relation and are appropriately used according to applications.

Incidentally, there are recently increasing demands for color liquid crystal display elements capable of expressing more vivid color images, while further expanding the color reproducibility of the liquid crystal display elements. Specifically, there are needs for displays with high chromatic purity of NTSC percentage of at least 80%.

However, the backlight using the aforementioned phosphors shows emissions in the other wavelength regions than red, green and blue, as sub-emissions as shown in FIG. 2, and these can be the cause of degrading the chromatic purity. Namely, these sub-emissions impede the expansion of the color reproduction range of the liquid crystal display elements.

A large amount of pigments are necessary for adjustment on the color filter side to adequately suppress the sub-emissions so as to improve the chromatic purity. However, the pigments originally have the characteristic of the spectral curve being not sharp, and thus the use of the large amount of pigments posed the problem that absorption also increased in the principal emission regions and the resultant image became dark as a whole. There were also the following problems: an increase of the pigment concentration in each pixel of the color filter degraded the performance as a photolithographic material, e.g., it resulted in increase of development time; it became difficult to control the pattern shape; the yield decreased; and so on. Furthermore, an increase of thickness of the color filter tended to cause trouble more readily in production steps of a liquid crystal panel and, in turn, led to an increase of production cost of the liquid crystal display device.

An improvement proposed to solve the above problems is a method of producing the color filter as a thin film at a high pigment concentration, by providing no resist performance to the color layer itself and effecting etching using a positive or negative type resist formed on the color layer. However, this method is not preferable because of its complex steps and increase of production cost as a result.

Furthermore, it is virtually impossible to achieve reproduction with ultrahigh chromatic purity of NTSC percentage of at least 95%, by the conventional backlights using the aforementioned cold-cathode tube. The main reason for it is that the conventional backlights have a principal emission peak as green emission wavelengths in a range of from 540 to 550 nm, as shown in FIG. 2. Namely, the green among the three primary colors in the NTSC system has the chromaticity coordinates of (0.21, 0.71), and the principal emission peak of from 540 to 550 nm is too yellowish to achieve the chromaticity coordinates.

In order to achieve the NTSC percentage of at least 80%, it is essential to improve the backlight, but it is not sufficient. Namely, it is also necessary to improve the color filter for spectrally separating the light from the backlight into the colors of the respective pixels, in conjunction with the improvement of the backlight. As an example, since the ordinary phosphors for green have the principal emission peak in the region of from 540 to 550 nm, a colorant for the green pixels of the color filter is adjusted so as to achieve as high a transmittance as possible in the wavelength region and efficiently absorb emissions from the blue phosphor and red phosphor in consideration of light utilization efficiency. However, for example, if there is a change in the green emission wavelengths of the backlight, the balance will be lost between those in the green pixels of the same color filter. On the other hand, as to the red pixels and the blue pixels, there can occur a state in which an emission appears in a wavelength region in which the emission was weak before and in which the color filter was not required to strongly absorb the emission from the backlight, and it thus becomes necessary to adjust the colorants in connection therewith.

Under such circumstances, for example, JP-A-9-97017 describes that a phosphor having no emission peak in a region of from 470 to 510 nm is used for the light source of the backlight and that the emission spectrum of the phosphor is different from those of the ordinary green phosphors, as is the case in the present invention, but it does not take into account a combination with an appropriate color filter suitable for the light source and thus fails to achieve the ultrahigh chromatic purity of NTSC percentage of at least 80%.

For these reasons, the simple improvement in the emission wavelengths of the backlight cannot achieve the ultrahigh chromatic purity of NTSC percentage of at least 80% or even at least 90%, while the conventional color filter is used as it is.

On the other hand, the problem of sub-emission is also prominent about the red pixels. Namely, the conventional red phosphors have a red emission peak near the wavelength of 610 nm, and the green phosphors have the sub-emission near the wavelengths of from 585 to 590 nm. It is, therefore, necessary to make a definite contrast of transmittance in a small interval of 20 nm between the wavelengths of 590 and 610 nm. It is, however, impossible to achieve the adequate contrast in this wavelength region by the presently, industrially available colorants such as pigments and dyes. As a result, in order to obtain the red pixels with high chromatic purity, the pigment had to be used in large quantity with an inevitable sacrifice of brightness.

Furthermore, the chromaticities of the red pixels normally used at present are of the most reddish (less yellowish) type and are near the chromaticity (0.65, 0.33) in the CIE XYZ calorimetric system. However, the red pixels of much stronger red are effective in expanding the color reproduction range. However, a further shift of the red pixels toward red will result in darkening images. Namely, it is the present status as to the red pixels that a compromise must be made at some point of balance between brightness and the color reproduction range.

Furthermore, with the backlight made from the conventionally used red phosphor having the emission peak near 610 nm, the purity of red was not sufficient and it was difficult to reproduce adequately deep red images.

The first invention of the present application has been accomplished under such circumstances and it is, therefore, an object of the invention to provide a color liquid crystal display device capable of achieving reproduction of a deeper green image by green pixels with high chromatic purity, without sacrificing the brightness of the image, and thereby realizing a vivid color image indicating the high chromatic purity of NTSC percentage of at least 80% or even at least 90%.

It is also an object of the second invention of the present application to provide a color liquid crystal display device capable of achieving reproduction of a deeper red image by red pixels with high chromatic purity, without sacrificing the brightness of the image, and thereby realizing a vivid color image indicating the high chromatic purity of NTSC percentage of at least 70% or even at least 80%.

DISCLOSURE OF THE INVENTION

In the present application, a color liquid crystal display device capable of reproducing a deep green image is defined as the first invention, and a color liquid crystal display device capable of reproducing a deep red image, as the second invention.

The color liquid crystal display device of the first invention is a color liquid crystal display device comprising a combination of light shutters utilizing a liquid crystal, a color filter having color elements of at least three colors of red, green and blue corresponding to the light shutters, and a backlight for transmission illumination, wherein, under the following definitions: $\lambda_n$ nm represents a wavelength at every interval of 5 nm in the visible light region of from 380 to 780 nm; $T^G(\lambda_n)$ a spectral transmittance at a wavelength $\lambda_n$ nm by a green pixel of the color filter; $I(\lambda_n)$ a relative emission intensity, normalized by a total emission intensity, at a wavelength $\lambda_n$ nm from the backlight, these satisfy the following conditions (1) to (3):

(1) at one wavelength in 500 nm<$\lambda_n$<530 nm, $I(\lambda_n) \times T^G(\lambda_n) > 0.01$;

(2) in a wavelength region of 610 nm<$\lambda_n$<650 nm, $I(\lambda_n) \times T^G(\lambda_n) < 0.0001$;

(3) in a wavelength region of 400 nm<$\lambda_n$<450 nm, $I(\lambda_n) \times T^G(\lambda_n) < 0.0001$;

wherein $I(\lambda_n)$ is defined as follows:

$$S(\lambda_n) = \frac{\int_{\lambda_n - \Delta\lambda/2}^{\lambda_n + \Delta\lambda/2} s(\lambda) d\lambda}{\Delta\lambda}$$

$$I(\lambda_n) = \frac{s(\lambda_n)}{\sum_{\lambda=380}^{780} s(\lambda_n)}$$

where $S(\lambda)$ represents a measured value of emission intensity at a wavelength $\lambda$ from the backlight and is normally measured at a pitch of 0.5 nm or 1.0 nm, and $\Delta\lambda=5$ nm.

Namely, the present inventors have conducted intensive studies and found that, by optimizing the spectral curve of the color filter, particularly the spectral transmittance of the green pixels and the emission spectrum of the backlight, so as to satisfy the above conditions (1) to (3), it became feasible to reproduce deep green and thereby readily achieve the color liquid crystal display device with the NTSC percentage of at least 80% or even at least 90%, thus accomplishing the present invention.

The above condition (1) indicates that in the green wavelength region (from 500 to 530 nm), the emission intensity from the green pixel is high and it is possible to achieve the chromaticity coordinates (0.21, 0.71) of the green among the three primary colors in the NTSC system.

The above conditions (2) and (3) indicate that in the red region (from 610 to 650 nm) and in the blue region (from 400 to 450 nm), there is little unwanted light from the backlight and impurity is unlikely to occur in the color of the green pixel.

The reason why the present invention adopts $\Delta\lambda=5$ nm in the above definition of $I(\lambda_n)$ is as follows.

Namely, for measurement of the emission spectrum from the backlight, the resolution of the measurement is normally set to be approximately $\Delta\lambda$=from 0.5 nm to 1 nm, because the emission peaks from the phosphors are sharp (with Full Width at Half Maximum (FWHM) being small). On the other hand, the resolution of $\Delta\lambda$=from 5 nm to 10 nm is practically sufficient in calculation of color reproducibility for the liquid crystal display devices and others. Except for the case of FWHM>>$\Delta\lambda$, the apparent emission intensity $I(\lambda)$ is dependent upon $\Delta\lambda$, and thus $I(\lambda)$ is not uniquely determined unless $\Delta\lambda$ is determined. Therefore, the present invention adopts $\Delta\lambda=5$ nm.

The above conditions (1) to (3) are readily satisfied when a layer of a phosphor or a film of the phosphor in the backlight comprises a compound represented by the following general formula (4):

$$M^{II}_{1-x}Eu_xO \cdot a(Mg_{1-y}Mn_y)O \cdot bAl_2O_3 \quad (4)$$

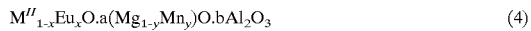

wherein $M^{II}$ represents at least one atomic element selected from the group consisting of Ba, Sr and Ca and a, b, x and y are real numbers satisfying the following inequalities:

$0.8 \leq a \leq 1.2$,
$4.5 \leq b \leq 5.5$,
$0.05 \leq x \leq 0.3$, and
$0.02 \leq y \leq 0.5$.

The color liquid crystal display device of the present invention as described above is applicable to displays with any color reproduction range, and is suitably used, particularly, in the so-called ultrahigh chromatic purity displays with the NTSC percentage of at least 80%, even at least 90%, or especially at least 95%, whereby it is feasible to readily substantialize the color reproduction range that could not be achieved in practice by the conventional combination of the color filter with the backlight.

In the present invention, the NTSC percentage of the color liquid crystal display device can be calculated by measuring the chromaticities of red, green and blue with a luminance meter and determining the color reproduction range according to the following equations, as in after-described Examples.

$$l = \sqrt{(X_R - X_G)^2 + (y_R - y_G)^2}$$

$$m = \sqrt{(X_G - X_B)^2 + (y_G - y_B)}$$

$$n = \sqrt{(X_B - X_R)^2 + (y_B - y_R)^2}$$

$$p = \frac{l + m + n}{2}$$

$$NTSC(\%) = \frac{\sqrt{p(p-l)(p-m)(p-n)}}{0.1582} \times 100$$

Preferably, the green pixel of the color filter forming the liquid crystal display device of the first invention is formed from a photosensitive color resin composition comprising (a) a binder resin and/or (b) a monomer, (c) a photopolymerization initiation system and (d) a colorant, the resin composition comprising an isoindolinone type pigment as (d) the colorant, wherein the resin composition as a coating in a thickness of 2.5 μm shows an average transmittance of at least 20% and at most 80%, more preferably at least 30% and at most 70%, at from 500 to 530 nm.

The color liquid crystal display device of the second invention is a color liquid crystal display device comprising a combination of light shutters utilizing a liquid crystal, a color filter having color elements of at least three colors of red, green and blue corresponding to the light shutters, and a backlight for transmission illumination, wherein, under the following definitions: $T^R(\lambda_n)$ represents a spectral transmittance at a wavelength $\lambda_n$ nm by a red pixel of the color filter; and $I(\lambda_n)$ a relative emission intensity, normalized by a total emission intensity, at a wavelength $\lambda_n$ nm from the backlight, these satisfy the following conditions (5) and (6):

(5) at one wavelength in 615 nm$\leq \lambda_n \leq$700 nm, $I(\lambda_n) \times T^R(\lambda_n) \geq 0.01$;

(6) at $\lambda_n$=585 nm, $I(\lambda_n) \times T^R(\lambda^n) < 0.007$;

wherein $I(\lambda_n)$ is defined by the same definition as in the aforementioned first invention.

In the second invention, by satisfying the above condition (5), it becomes feasible to provide the red pixel with higher brightness and with high purity, capable of efficiently transmitting the emission from the red phosphor with high chromatic purity. Furthermore, by satisfying the above condition (6), it becomes feasible to efficiently cut the sub-emission at the wavelength of 585 nm from a Tb type phosphor usually used as a green phosphor and to enhance the chromatic purity of the red pixel more.

The second invention involves optimization of the spectral curve of the red pixel of the color filter and the emission spectrum of the backlight on the basis of certain rules, whereby it is feasible to provide the red pixel with high chromatic purity, without sacrificing the brightness of the image, and, in turn, to readily achieve the expansion of the color reproduction range of the color liquid crystal display device.

In the second invention, preferably, at one wavelength in 615 nm=$\leq\lambda_n\leq$700 nm, $T^R(\lambda_n)$ further satisfies the following formula (7):

$$T^R(\lambda_n)/T_R(0.585)>8 \tag{7}$$

By satisfying the above condition (7), it becomes feasible to transmit the emission from the red phosphor more efficiently and provide the red pixel with higher brightness and with high purity, without damaging the chromatic purity of the red pixel achieved by the above conditions (5) and (6).

The above condition (5) can be readily satisfied by the color liquid crystal display device wherein the backlight comprises a phosphor layer or a film containing a phosphor in structure and wherein the phosphor layer or the phosphor film comprises one or two or more selected from the group consisting of $YVO_4:Eu^{3+}$ type phosphors, $Y(P,V)O_4:Eu^{3+}$ type phosphors, and $3.5MgO.0.5MgF_2.GeO_2:Mn^{4+}$ type phosphors.

As another technique, instead of using a cold-cathode tube or/and a hot-cathode tube containing the phosphor as a constituting element, it is also readily achieved by comprising as a constituting element of the backlight, at least a GaAsP type LED in the backlight.

The first invention and the second invention can be applied each singly, but it is normally preferable to use the first invention and the second invention in combination, in order to improve the chromatic purities of both green and red.

Figure 1:
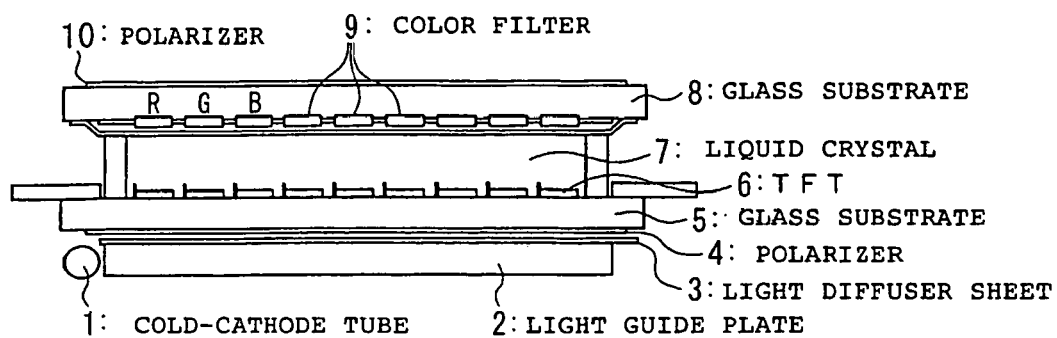
FIG. 1 is a view showing a configuration of a color liquid crystal display device of a TFT type.
Figure 2:
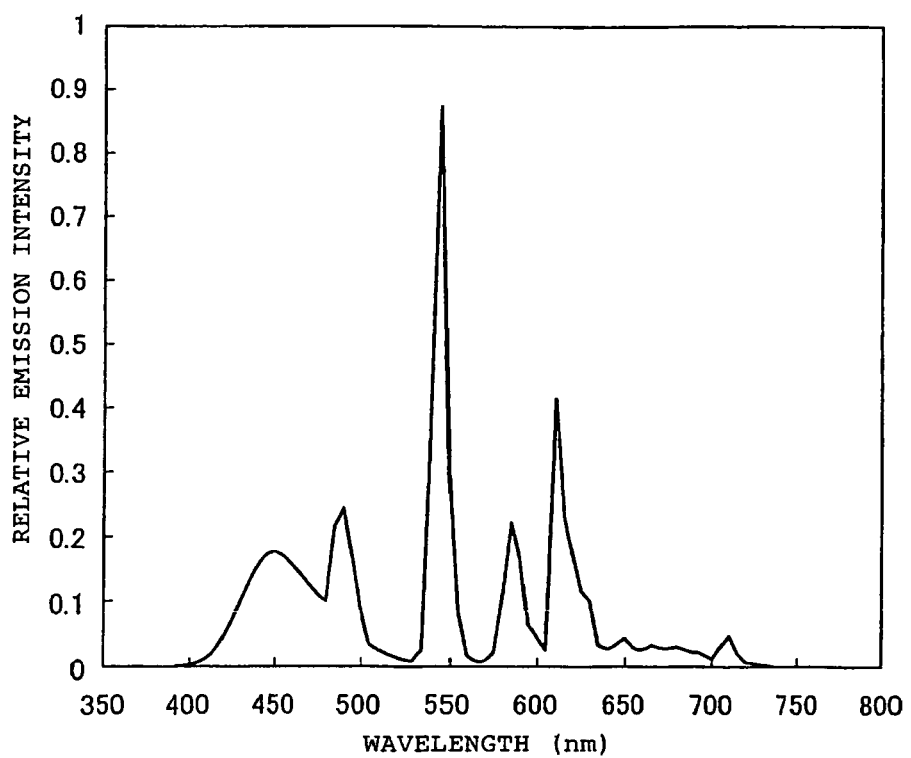
FIG. 2 is a graph showing an emission spectrum of a backlight used in a conventional color liquid crystal display device.

DESCRIPTION OF REFERENCE SYMBOLS 1 cold-cathode tube
2 light guide plate
3 light diffuser sheet
4, 10 polarizers
5, 8 glass substrates
7 liquid crystal
9 color filter
11 light guide member
12 linear light source
13 reflector
14 array
15 light control sheet
16, 16' light extracting mechanism
17 reflecting sheet

BEST MODE FOR CARRYING OUT THE INVENTION

Embodiments of the color liquid crystal display devices of the present invention will be described below in detail with reference to the drawings.

Color Liquid Crystal Display Device

A color liquid crystal display device of the present invention comprises a combination of light shutters utilizing a liquid crystal, a color filter having color elements of at least three colors of red, green and blue corresponding to the light shutters, and a backlight for transmission illumination. There are no particular restrictions on the specific configuration of the device, but a specific example is a color liquid crystal display device of a TFT type as shown in FIG. 1.

FIG. 1 shows an example of the color liquid crystal display device of the TFT (thin film transistor) type using a side-light type backlight device and a color filter. In this liquid crystal display device, light emitted from a cold-cathode tube 1 is converted into an area light source by a light guide plate 2, a light diffuser sheet 3 further enhances uniformity of the light, and the light then passes a prism sheet to enter a polarizer 4. For this incident light, a direction of polarization is controlled in each pixel by TFT 6 and thereafter the light is incident into a color filter 9. Finally, the light passes through a polarizer 10 with the direction of polarization perpendicular to that of the polarizer 4 and then reaches an observer. The degree of change of the polarization direction of the incident light varies depending upon an applied voltage to TFT 6, so as to change the quantity of light passing through the polarizer 6, thus enabling display of a color image. Numerals 5 and 8 denote transparent substrates (glass substrates), and 7 a liquid crystal.

Backlight Device

First, the configuration of the backlight device used in the color liquid crystal display device as described above will be described below.

The backlight device used in the present invention is an area light source device disposed on a back face of a liquid crystal panel and used as a back light source means for a transmission type or semi-transmission type color liquid crystal display device.

Specific configuration examples of the backlight device include the following configurations: a device is comprised of a light source which is either a cold-cathode tube or a hot-cathode tube, or a combination of both, and a light uniformizing means for converting the light-source light into a nearly uniform area light source; a device is comprised of a light source which is one or a combination of two or more out of an LED to emit ultraviolet or blue or deep blue light, a cold-cathode tube, a hot-cathode tube, and an area light-emitting device, and a substrate provided with a phosphor to emit visible light against the light-source light, on a substrate surface and thereby having a function of converting the light-source light into visible light; a device is constructed by a method of combining three-color LEDs to emit light in the red green and blue wavelength regions; and so on.

Typical examples of installation of the light source such as the cold-cathode tube, hot-cathode tube, LED, etc. include a method of placing the light source immediately below the back face of the liquid crystal elements (direct backlight system), and a method of placing the light source on a side face and using an optically transparent light guide such as an acrylic plate or the like to convert the light into area light to obtain an area light source (side light system). Among others, the side light system as shown in FIGS. 3 and 4 is suitably applicable as an area light source being thin and excellent in uniformity of luminance distribution, and is now most commonly put to practical use.

Figure 3:
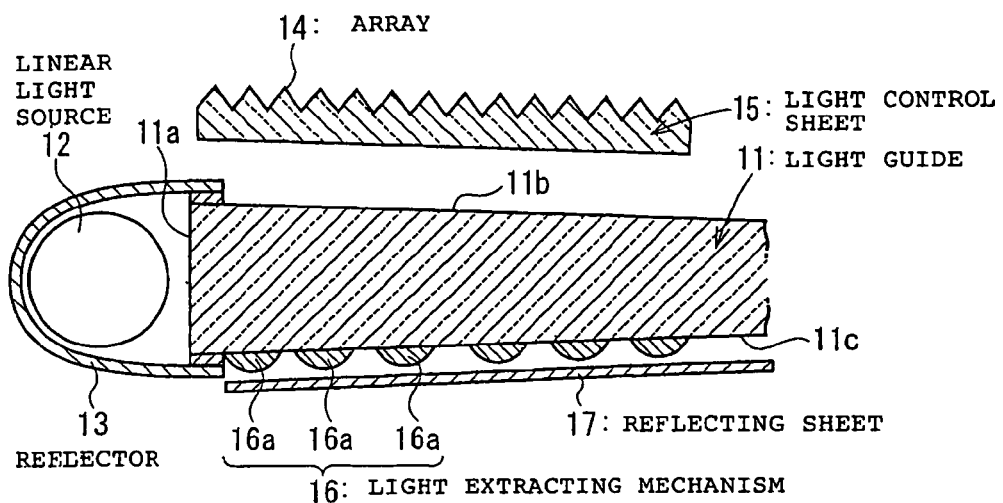
FIG. 3 is a sectional view showing an example of a backlight device suitable for the present invention.

The backlight device of FIG. 3 is configured so that a linear light source 12 is placed along one side end face 11a of a substrate consisting of an optically transparent flat plate, i.e., a light guide 11, a reflector 13 is attached so as to cover the linear light source 12, and beams of direct light from the linear light source 12 and reflected light from the reflector 13 are made incident through one side end face 11a as a light entrance face into the interior of the light guide 11. One surface 11b of the light guide 11 serves as a light exit face, and a light control sheet 15 with an array 14 of nearly triangular prism shape formed therein is placed above the light exit face 11b so that apex angles of the array 14 are directed toward the observer. A light extracting mechanism 16 printed in a predetermined pattern of many dots 16a of light scattering ink is provided on the other face 11c opposite to the light exit face 11b in the light guide 11. On this face 11c side, a reflecting sheet 17 is provided in proximity to this face 11c.

Figure 4:
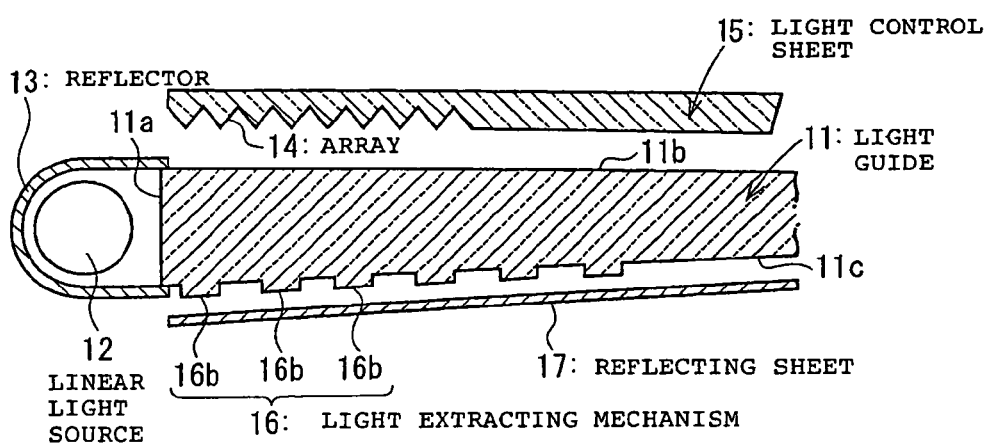
FIG. 4 is a sectional view showing another example of a backlight device suitable for the present invention.

The backlight device of FIG. 4 is constructed in much the same configuration as the backlight device shown in FIG. 3, except that the light control sheet 15 with the prism array 14 of nearly triangular prism shape formed therein is located so that the apex angles of the array 14 are directed toward the light exit face 11b of the light guide 11 and except that the light extracting mechanism 16' provided in the face 11c opposite to the light exit face 11b of the light guide 11 is comprised of a rough pattern 16b with each surface being formed as a rough surface.

By adopting the backlight devices of the side light system as described above, it is feasible to bring out the lightweight and low-profile features of the liquid crystal display device more effectively.

The light source of the backlight devices of this type can be generally any light source of a type providing emissions in the red, green and blue wavelength regions, i.e., in ranges of from 580 to 700 nm, from 500 to 550 nm and from 400 to 480 nm.

In the first invention of the present application, the relative emission intensity $I(\lambda_n)$ needs to be high in the green emission region of from 500 to 530 nm, in order to enhance the chromatic purity of the green pixels and reproduce a deep green image.

A method of letting the backlight satisfy this condition can be a method of adjusting a mixture ratio so as to achieve the above relative emission intensity $I(\lambda_n)$ in a method of using a mixture of three or more types of phosphors or LEDs having the principal emission wavelength peaks in the ranges of the red region (from 610 to 700 nm), the green region (from 500 to 530 nm) and the blue region (from 400 to 480 nm), a method of combining a yellow-emitting phosphor with a blue-emitting LED, and so on.

In the case of the former method as an example, the phosphor having the principal emission wavelength in the red region in the first invention can be selected from $Y_2O_3$:Eu type phosphors, $Y(P,V)O_4$:Eu$^{3+}$ type phosphors, and $3.5MgO.0.5MgF_2.GeO_2$:Mn$^{4+}$ type phosphors. In the case of the $Y(P,V)O_4$:Eu$^{3+}$ type phosphors, the principal emission wavelength can be finely adjusted by the ratio of P to V, using either P or V, or both.

The phosphor having the principal emission wavelength in the green region in the first invention can be selected from $LaPO_4$:Ce,Tb phosphors, $Zn_2SiO_4$:Mn phosphors, and $M^{II}_{1-x}Eu_xO.a(Mg_{1-y}Mn_y)O.bAl_2O_3$ phosphors (where $M^{II}$ represents at least one atomic element selected from the group consisting of Ba, Sr and Ca, and a, b, x and y are real numbers satisfying $0.8 \leq a \leq 1.2$, $4.5 \leq b \leq 5.5$, $0.05 \leq x \leq 0.3$ and $0.02 \leq y \leq 0.5$). In view of the emission wavelengths, it is particularly preferable to use the $M^{II}_{1-x}Eu_xO.a(Mg_{1-y}Mn_y)O.bAl_2O_3$ phosphors having the principal emission wavelength near 515 nm ($M^{II}$ represents at least one atomic element selected from the group consisting of Ba, Sr and Ca, among which Ba is used particularly preferably; and a, b, x and y are real numbers satisfying $0.8 \leq a \leq 1.2$, $4.5 \leq b \leq 5.5$, $0.05 \leq x \leq 0.3$ and $0.02 \leq y \leq 0.5$) The LED to be used can be selected particularly preferably from GaP type LEDs.

The phosphor having the principal emission wavelength in the blue region in the first invention can be selected from $BaMgAl_{10}O_{17}$:Eu phosphors and $(Sr,Ca,Ba)_{10}(PO_4)_6Cl_2$:Eu phosphors or $(Sr,Ca,Ba,Mg)_{10}(PO_4)_6Cl_2$:Eu phosphors. The LED having the principal emission wavelength in the blue region can be selected from InGaN type LEDs and GaN type LEDs.

These phosphors or/and LEDs are used as a mixture at an appropriate mixture ratio so as to take into account the white balance determining the tone of an image and so as to achieve the relative emission intensity $I(\lambda_n)$ satisfying the above formulae (1) to (3). The white balance is usually expressed by emission chromaticity and color temperature of the liquid crystal display elements with all the red, green and blue pixels on and is preferably set so that the chromaticity is near the daylight locus and the color temperature falls in the range of from 5000K to 15000K.

In the case of the cold-cathode tube, the above condition can be substantialized by compounding a total of from 20 to 60 parts by weight of one or two or more red phosphors selected from the $Y_2O_3$:Eu type phosphors, the $Y(P,V)O_4$:Eu$^{3+}$ type phosphors and the $3.5MgO.0.5MgF_2.GeO_2$:Mn$^{4+}$ type phosphors, a total of from 10 to 50 parts by weight of one or two or more green phosphors selected from the $Zn_2SiO_4$:Mn phosphors and the $M^{II}_{1-x}Eu_xO.a(Mg_{1-y}Mn_y)O.bAl_2O_3$ phosphors ($M^{II}$ represents at least one atomic element selected from the group consisting of Ba, Sr and Ca, and a, b, x and y are real numbers satisfying $0.8 \leq a \leq 1.2$, $4.5 \leq b \leq 5.5$, $0.05 \leq x \leq 0.3$, and $0.02 \leq y \leq 0.5$), and a total of from 20 to 55 parts by weight of one or two or more blue phosphors selected from the $BaMgAl_{10}O_{17}$:Eu phosphors and the $(Sr,Ca,Ba)_{10}(PO_4)_6Cl_2$:Eu phosphors or $(Sr,Ca,Ba,Mg)_{10}(PO_4)_6Cl_2$:Eu phosphors. In the LED case, the above condition can be substantialized by combining LED chips of red-emitting GaAsP type LEDs, green-emitting GaP type LEDs and blue-emitting GaN type LEDs, for example, at a ratio of the numbers of respective chips of 1:2:1.

In the second invention, in order to satisfy the foregoing condition (5), it is important for the red light source to have the principal emission wavelength in the range of from 615 to 700 nm and preferably in the range of from 615 to 660 nm.

A method of letting the backlight satisfy this condition is a method of using one or two or more phosphors selected from the group consisting of $YVO_4$:Eu$^{+3}$ type phosphors, $Y(P,V)O_4$:Eu$^{3+}$ type phosphors and $3.5MgO.0.5MgF_2$: $GeO_2$:Mn$^{4+}$ type phosphors, or using the GaAsP type LEDs. In the case of the $Y(P,V)O_4$:Eu$^{3+}$ type phosphors, the principal emission wavelength can be finely adjusted by the ratio of P to V, using either P or V, or both, either of which can be applied in the present invention.

On the other hand, there are no particular restrictions on the green and blue light sources, and any light source can be used as long as its principal emission wavelength falls in the range of the wavelength region of from 500 to 550 nm for green or in the range of the wavelength region of from 400 to 500 nm for blue. Specific examples of the green light source include the $Zn_2SiO_4$:Mn phosphors, the $M''_{1-x}Eu_xO.a(Mg_{1-y}Mn_y)O.bAl_2O_3$ phosphors ($M^{II}$ represents an atomic element selected from Ba, Sr and Ca, and a, b, x and y are real numbers satisfying $0.8 \leq a \leq 1.2$, $4.5 \leq b \leq 5.5$, $0.05 \leq x \leq 0.3$, and $0.02 \leq y \leq 0.5$), and the GaP type LEDs; specific examples of the blue light source include the $BaMgAl_{10}O_{17}$:Eu phosphors, the $(Sr,Ca,Ba)_{10}(PO_4)_6Cl_2$:Eu phosphors, or the $(Sr,Ca,Ba,Mg)_{10}(PO_4)_6Cl_2$:Eu phosphors, the InGaN type LEDs, and so on.

Particularly, for producing the color liquid crystal display device of the ultrahigh chromatic purity type with the NTSC percentage of at least 90%, preferably, the green light source has the principal emission wavelength in the range of from 500 to 530 nm so as to satisfy the foregoing condition (1) of the first invention, and the blue light source has the principal emission wavelength in the range of from 400 to 450 nm.

Just as in the case of the first invention, the backlight is constructed by appropriately combining three or more phosphors or LEDs, or both the phosphors and LEDs as described above so as to take the white balance into account and achieve the relative emission intensity $I(\lambda_n)$ satisfying the foregoing formulae (5) and (6). The white balance is usually expressed by emission chromaticity and color temperature of the liquid crystal display elements with all the red, green and blue pixels on, and is preferably set so that the chromaticity is near the daylight locus and the color temperature falls in the range of from 5000K to 15000K.

In the case of the cold-cathode tube, the above condition can be substantialized by compounding a total of from 20 to 60 parts by weight of one or two or more red phosphors selected from the $Y(P,V)O_4$:$Eu^{3+}$ type phosphors and the $3.5MgO.0.5MgF_2.GeO_2$:$Mn^{4+}$ type phosphors, a total of from 10 to 50 parts by weight of one or two or more green phosphors selected from the $LaPO_4$:Ce,Tb phosphors, the $Zn_2SiO_4$:Mn phosphors and the $M''_{1-x}Eu_xO.a(Mg_{1-y}Mn_y)O.bAl_2O_3$ phosphors ($M^{II}$ represents at least one atomic element selected from the group consisting of Ba, Sr and Ca, and a, b, x and y are real numbers satisfying $0.8 \leq a \leq 1.2$, $4.5 \leq b \leq 5.5$, $0.05 \leq x \leq 0.3$ and $0.02 \leq y \leq 0.5$), and a total of from 20 to 55 parts by weight of one or two or more blue phosphors selected from the $BaMgAl_{10}O_{17}$:Eu phosphors, the $(Sr,Ca,Ba)_{10}(PO_4)_6Cl_2$:Eu phosphors or the $(Sr,Ca,Ba,Mg)_{10}(PO_4)_6Cl_2$:Eu phosphors. In the LED case, the condition can be substantialized by combining LED chips of red-emitting GaAsP type LEDs, green-emitting GaP type LEDs and blue-emitting GaN type LEDs, for example, at a ratio of the numbers of respective chips of 1:2:1.

Color Filter

The color filter will be described below.

The color filter is a filter obtained by forming fine pixels of red, green, blue and so on on a transparent substrate of glass or the like by a method of dyeing, printing, electrodeposition, pigment dispersion, or the like. In order to block leaking light between these pixels and obtain images with higher quality, it is often the case to provide a light shielding pattern called a black matrix between pixels.

A color filter by dyeing is fabricated as follows: an image is formed by a photosensitive resin obtained by mixing a dichromate as a photosensitive agent into gelatin, polyvinyl alcohol, or the like, followed by dyeing. A color filter by printing is fabricated by transferring a heat-curing or photo-curing ink onto a transparent substrate of glass or the like by such a method as screen printing or flexographic printing. A color filter by electrodeposition is formed by electrophoresis effected while a transparent substrate of glass or the like with an electrode thereon is immersed in a bath containing a pigment or a dye. A color filter by pigment dispersion is formed by applying a composition in which a colorant such as a pigment is dispersed or dissolved in a photosensitive resin, onto a transparent substrate of glass or the like to form a coating film thereon, exposing the coating film to radiation through a photomask to effect exposure, and removing unexposed portions by a development process to form a pattern. The color filter can also be fabricated by other methods than these, including a method of applying a polyimide type resin composition in which a colorant is dispersed or dissolved, and forming a pixel image by etching, a method of attaching a film coated with a resin composition containing a colorant, to a transparent substrate, peeling it off, and effecting image exposure and development to form a pixel image, a method of forming a pixel image by an ink jet printer, and so on.

In the recent years, the pigment dispersion method is mainstream in fabrication of the color filters for liquid crystal display elements by virtue of its high productivity and excellent microfabrication property, but the color filter according to the present invention can be fabricated by any one of the above-mentioned production methods.

Examples of methods of forming the black matrix include a method of forming a chromium and/or chromium oxide (single-layer or multi-layer) film over an entire surface of a transparent substrate of glass or the like by a method such as sputtering, and thereafter removing only color pixel portions by etching, a method of applying a photosensitive composition in which a light shielding component is dispersed or dissolved, onto a transparent substrate of glass or the like to form a coating film, exposing the coating film to radiation through a photomask to effect exposure, and removing unexposed portions by development to form a pattern, and so on.

Composition for Color Filter

Raw materials for production of the color filter will be described below, using an example of the pigment dispersion method which is recently mainstream.

The pigment dispersion method uses a composition in which a colorant such as a pigment is dispersed in a photosensitive resin as described above (hereinafter called a "composition for a color filter"). This composition for a color filter is generally a photosensitive color resin composition for a color filter in which (a) a binder resin and/or (b) a monomer as a photosensitive component, (c) a photopolymerization initiation system, (d) a colorant and (e) other components are dissolved or dispersed in a solvent.

Each of the components will be described below in detail. In the description below, "(meth)acryl", "(meth)acrylate" and "(meth)acrylol" mean "acryl or methacryl", "acrylate or methacrylate" and "acrylol or methacrylol" respectively.

(a) Binder Resin

Where a binder resin is used singly, an appropriate one is properly selected in consideration of an image forming property and performance to be targeted, a production method desired to adopt, and so on. Where a binder resin is used in combination with a monomer described later, the binder resin is added in order to modify the composition for a color filter and improve the physical properties after photo-curing. In this case, therefore, a binder resin is properly selected according to a purpose of an improvement in compatibility, a film forming property, a development property, an adhesion property, or the like.

The binder resins usually used are, for example, homopolymers or copolymers of (meth)acrylic acid, (meth)acrylates, (meth)acrylamide, maleic acid, (meth)acrylonitrile, styrene, vinyl acetate, vinylidene chloride, maleimide, and so on, polyethylene oxides, polyvinyl pyrrolidones, polyamides, polyurethanes, polyesters, polyethers, polyethylene terephthalates, acetylcelluloses, novolak resins, resol resins, polyvinyl phenols, polyvinyl butyrals, and so on.

Among these binder resins, preferred binder resins are those having a carboxyl group or a phenolic hydroxyl group in a side chain or in the main chain thereof. Development in an alkali solution becomes possible with use of the resins having these functional groups. Among them, preferred binder resins are resins having a carboxyl group, which have a high alkali development property; for example, (co)polymers of acrylic acid, resins of styrene/maleic anhydride, resins of novolak epoxy acrylate modified with an acid anhydride, and so on.

Particularly preferred binder resins are (co)polymers containing (meth)acrylic acid or a (meth)acrylate having a carboxyl group (these will be referred to as "acrylic resins" in the present specification). Namely, these acrylic resins are preferred in terms of easy controllability of performance and a production method because they are excellent in the development property and transparency and can provide various copolymers from a wide range of monomers.

Specific examples of the acrylic resins include resins that comprise, as an essential component, (meth)acrylic acid and/or a compound obtained by adding an acid (anhydride), such as (anhydrous) succinic acid, (anhydrous) phthalic acid, (anhydrous) maleic acid, or the like, to a hydroxyalkyl (meth)acrylate, such as succinic acid (2-(meth)acryloyloxyethyl) ester, adipic acid (2-acryloyloxyethyl) ester, phthalic acid (2-(meth)acryloyloxyethyl) ester, hexahydrophthalic acid (2-(meth)acryloyloxyethyl) ester, maleic acid (2-(meth) acryloyloxyethyl) ester, succinic acid (2-(meth)acryloyloxypropyl) ester, adipic acid (2-(meth)acryloyloxypropyl) ester, hexahydrophthalic acid (2-(meth)acryloyloxypropyl) ester, phthalic acid (2-(meth)acryloyloxypropyl) ester, maleic acid (2-(meth)acryloyloxypropyl) ester, succinic acid (2-(meth)acryloyloxybutyl) ester, adipic acid (2-(meth)acryloyloxybutyl) ester, hexahydrophthalic acid (2-(meth)acryloyloxybutyl) ester, phthalic acid (2-(meth)acryloyloxybutyl) ester, maleic acid (2-(meth)acryloyloxybutyl) ester, or the like; and that are copolymerized, if necessary, with one of various monomers, e.g., styrene type monomers such as styrene, α-methylstyrene, vinyltoluene, and so on; unsaturated group-containing carboxylic acids such as cinnamic acid, maleic acid, fumaric acid, maleic anhydride, itaconic acid, and so on; (meth)acrylates such as methyl (meth)acrylate, ethyl (meth)acrylate, propyl (meth)acrylate, allyl (meth)acrylate, butyl (meth)acrylate, 2-ethylhexyl (meth) acrylate, hydroxyethyl (meth)acrylate, hydroxypropyl (meth)acrylate, benzyl (meth)acrylate, hydroxyphenyl (meth)acrylate, methoxyphenyl (meth)acrylate, and so on; compounds obtained by adding to (meth)acrylic acid, one of lactones such as ε-caprolactone, β-propiolactone, γ-butyrolactone, δ-valerolactone, and so on; acrylonitrile; acrylamides such as (meth)acrylamide, N-methylolacrylamide, N,N-dimethylacrylamide, N-methacryloyl morpholine, N,N-dimethylaminoethyl (meth)acrylate, N,N-dimethylaminoethylacrylamide, and so on; vinyl acids such as vinyl acetate, vinyl versatate, vinyl propionate, vinyl cinnamate, vinyl pivalate, and so on.

For a purpose of increasing the strength of the coating film, acrylic resins preferably used are those obtained by copolymerization of from 10 to 98 mol %, preferably from 20 to 80 mol %, more preferably from 30 to 70 mol % of one of monomers having a phenyl group, such as styrene, α-methylstyrene, benzyl (meth)acrylate, hydroxyphenyl (meth)acrylate, methoxyphenyl (meth)acrylate, hydroxyphenyl (meth)acrylamide, hydroxyphenyl (meth)acrylsulfoamide, and so on, and from 2 to 90 mol %, preferably from 20 to 80 mol %, more preferably from 30 to 70 mol % of at least one monomer selected from the group consisting of (meth)acrylic acid, or (meth)acrylates having a carboxyl group, such as succinic acid (2-(meth)acryloyloxyethyl) ester, adipic acid (2-acryloyloxyethyl) ester, phthalic acid (2-(meth)acryloyloxyethyl) ester, hexahydrophthalic acid (2-(meth)acryloyloxyethyl) ester, maleic acid (2-(meth) acryloyloxyethyl) ester, and so on.

In addition, these resins preferably have an ethylenic double bond in a side chain. By using a binder resin having a double bond in a side chain, the photo-curing property of the composition for a color filter obtained is enhanced, whereby it is feasible to further improve the resolving property and adhesion property.

Means for introducing an ethylenic double bond into a binder resin include, for example, methods disclosed in JP-B-50-34443, JP-B-50-34444, and so on; i.e., a method of reacting a compound having both a glycidyl group/an epoxy cyclohexyl group, and a (meth)acryloyl group with a carboxylic group of a resin, and a method of reacting an acrylic acid chloride or the like with a hydroxyl group of a resin.

For example, a binder resin having an ethylenic double bond in a side chain is obtained by reacting a compound, such as glycidyl (meth)acrylate, allyl glycidyl ether, glycidyl α-ethylacrylate, crotonyl glycidyl ether, (iso)crotonic acid glycidyl ether, (3,4-epoxycyclohexyl)methyl (meth)acrylate, (meth)acrylic acid chloride, or (meth)acryl chloride, with a resin having a carboxyl group or a hydroxyl group. Particularly preferred binder resins are those resulting from a reaction with an alicyclic epoxy compound such as (3,4-epoxy cyclohexyl)methyl (meth)acrylate.

When an ethylenic double bond is preliminarily introduced into a resin having a carboxylic group or hydroxyl group as described above, it is preferable to bond a compound having an ethylenic double bond to from 2 to 50 mol %, preferably from 5 to 40 mol %, of the carboxyl group or hydroxyl group in the resin.

These acrylic resins preferably have a weight-average molecular weight, as measured by GPC, in a range of from 1,000 to 100,000. If the weight-average molecular weight is less than 1,000, it tends to be difficult to obtain a uniform film. On the other hand, if it exceeds 100,000, the development property tends to degrade. A preferred content of the carboxylic group is in a range of from 5 to 200 as an acid value. If the acid value is less than 5, the resin tends to be insoluble in an alkali developer. On the other hand, if it exceeds 200, the sensitivity may become lower.

These binder resins are contained in a range of normally from 10 to 80% by weight, preferably from 20 to 70% by weight, to the total solid content of the composition for a color filter.

(b) Monomer

There are no particular restrictions on the monomer as long as it is a polymerizable low molecular weight compound. A preferred monomer is an addition-polymerizable compound having at least one ethylenic double bond (hereinafter, abbreviated as an "ethylenic compound"). The ethylenic compound is a compound having an ethylenic double bond which is addition-polymerized by the action of a photopolymerization initiator system as described hereinafter, to cure when the composition for a color filter is exposed to active rays. Here the monomer in the present invention implies a concept obverse to a so-called polymer substance and implies a concept embracing not only monomers in a narrow sense but also dimers, trimers, and oligomers.

The ethylenic compound may be, for example, an unsaturated carboxylic acid, an ester of an unsaturated carboxylic acid with a monohydroxy compound, an ester of an aliphatic polyhydroxy compound with an unsaturated carboxylic acid, an ester of an aromatic polyhydroxy compound with an unsaturated carboxylic acid, an ester obtained by an esterification reaction of an unsaturated carboxylic acid and a polybasic carboxylic acid with a polyhydric hydroxy compound such as the aforementioned aliphatic polyhydroxy compound or aromatic polyhydroxy compound, an ethylenic compound with a urethane skeleton obtained by reacting a polyisocyanate compound with a (meth)acryloyl-containing hydroxy compound, or the like.

The unsaturated carboxylic acid may be, for example, (meth)acrylic acid, (anhydrous) maleic acid, crotonic acid, itaconic acid, fumaric acid, 2-(meth)acryloyloxyethyl succinic acid, 2-acryloyloxyethyl adipic acid, 2-(meth)acryloyloxyethyl phthalic acid, 2-(meth)acryloyloxyethyl hexahydrophthalic acid, 2-(meth)acryloyloxyethyl maleic acid, 2-(meth)acryloyloxypropyl succinic acid, 2-(meth)acryloyloxypropyl adipic acid, 2-(meth)acryloyloxypropyl hydrophthalic acid, 2-(meth)acryloyloxypropyl phthalic acid, 2-(meth) acryloyloxypropyl maleic acid, 2-(meth)acryloyloxybutyl succinic acid, 2-(meth)acryloyloxybutyl adipic acid, 2-(meth)acryloyloxybutyl hydrophthalic acid, 2-(meth)acryloyloxybutyl phthalic acid, 2-(meth) acryloyloxybutyl maleic acid, a monomer obtained by adding to (meth)acrylic acid one of lactones such as ε-caprolactone, β-propiolactone, γ-butyrolactone, -valerolactone, and so on, a monomer obtained by adding to a hydroxyalkyl (meth) acrylate, an acid (anhydride) such as (anhydrous) succinic acid, (anhydrous) phthalic acid or (anhydrous) maleic acid, or the like. Among them, (meth)acrylic acid and 2-(meth) acryloyloxyethyl succinic acid are preferred, and (meth) acrylic acid is more preferred. These may be used in combination of two or more.

The ester of an aliphatic polyhydroxy compound with an unsaturated carboxylic acid may be an acrylate such as ethylene glycol diacrylate, triethylene glycol diacrylate, trimethylolpropane triacrylate, trimethylolethane triacrylate, pentaerythritol diacrylate, pentaerythritol triacrylate, pentaerythritol tetraacrylate, dipentaerythritol tetraacrylate, dipentaerythritol pentaacrylate, dipentaerythritol hexaacrylate, glycerol acrylate, or the like. Further, the ester may be a methacrylate, an itaconate, a crotonate or a maleate obtained by replacing the acrylic acid moiety of the aforementioned acrylates with a methacrylic acid moiety, an itaconic acid moiety, a crotonic acid moiety or a maleic acid moiety, respectively.

The ester of an aromatic polyhydroxy compound with an unsaturated carboxylic acid may be hydroquinone diacrylate, hydroquinone dimethacrylate, resorcin diacrylate, resorcin dimethacrylate, pyrogallol triacrylate, or the like.

The ester obtained by an esterification reaction of an unsaturated carboxylic acid and a polybasic carboxylic acid with a polyhydric hydroxy compound is not necessarily a single substance, but it may be a mixture. Typical examples of the ester include a condensation product of acrylic acid, phthalic acid and ethylene glycol, a condensation product of acrylic acid, maleic acid and diethylene glycol, a condensation product of methacrylic acid, terephthalic acid and pentaerythritol, a condensation product of acrylic acid, adipic acid, butanediol and glycerol, and so on.

The ethylenic compound with a urethane skeleton obtained by reacting a polyisocyanate compound and a (meth)acryloyl group-containing hydroxy compound may be a reaction product of an aliphatic diisocyanate such as hexamethylene diisocyanate, trimethylhexamethylene diisocyanate, or the like; an alicyclic diisocyanate such as cyclohexane diisocyanate, isophorone diisocyanate, or the like; an aromatic diisocyanate such as tolylene diisocyanate, diphenylmethane diisocyanate, or the like, with a (meth)acryloyl group-containing hydroxy compound such as 2-hydroxyethyl acrylate, 2-hydroxyethyl methacrylate, 3-hydroxy(1,1, 1-triacryloyloxymethyl) propane, 3-hydroxy(1,1,1-trimethacryloyloxymethyl) propane, or the like.

Other examples of the ethylenic compound used in the present invention include acryl amides such as ethylenebisacrylamide; allyl esters such as diallyl phthalate; vinyl group-containing compounds such as divinyl phthalate.

The compounding rate of the ethylenic compounds is usually in a range of from 10 to 80% by weight, preferably in a range of from 20 to 70% by weight, relative to the total solid content of the composition for a color filter.

(c) Photopolymerization Initiation System

In a case in which the composition for a color filter comprises an ethylenic compound as (b) a monomer, it is necessary to use a photopolymerization initiation system having a function of directly absorbing light or being sensitized with light to induce a decomposition or hydrogen abstraction reaction to generate polymerization-active radicals.

The photopolymerization initiation system is comprised of a system containing a polymerization initiator and an additive such as an accelerator. The polymerization initiator may be, for example, a radical activator, such as metallocene compounds including titanocene compounds as described in each of JP-A-59-152396 and JP-A-61-151197, hexaaryl biimidazole derivatives such as 2-(2'-chlorophenyl)-4,5-diphenyl imidazol, halomethyl-s-triazine derivatives, N-aryl-α-amino acids such as N-phenyl glycine, salts of N-aryl-α-amino acids, esters of N-aryl-α-amino acids, and so on as described in JP-A-10-39503. The accelerator to be used is, for example, alkyl N,N-dialkylamino benzoate such as ethyl N,N-dimethylaminobenzoate, a mercapto compound having a heterocyclic ring such as 2-mercaptobenzothiazole, 2-mercaptobenzoxazole or 2-mercaptobenzoimidazole, an aliphatic polyfunctional mercapto compound, or the like. Each of the polymerization initiator and the additive may be used in combination of two or more kinds.

The compounding rate of the photopolymerization initiation system is in a range of from 0.1 to 30% by weight, preferably from 0.5 to 20% by weight, more preferably from 0.7 to 10% by weight to the total solid content of the composition of the present invention. If the compounding rate is too low, the sensitivity will become lower. On the other hand, if it is too high, the solubility of unexposed portions in a developer will be degraded, so as to easily induce development failure.

(d) Colorant

In order to utilize the light from the backlight as effectively as possible, it is necessary to select a colorant so that, in accordance with the red, green and blue emission wavelengths of the backlight, the transmittance at the emission wavelengths of the phosphor in each color pixel becomes as high as possible, while the transmittance becomes as low as possible at the other emission wavelengths.

In the first invention of the present application, the colorants are selected as follows. For the red pixels, a colorant is preferably selected to satisfy the following conditions: the product of the relative emission intensity $I(\lambda_R)$ normalized by the total emission intensity from the backlight, and the spectral transmittance $T^R(\lambda_R)$ of the red color filter at the principal emission wavelength $\lambda_R$ of the red phosphor, i.e., $I(\lambda_R) \times T^R(\lambda_R)$ is normally at least 0.01, preferably at least 0.05; and $I(\lambda_n) \times T^R(\lambda_n)$ is normally at most 0.001, preferably at most 0.0005 in a wavelength region of $\lambda_G - \Delta\lambda_G/2 < \lambda_n < \lambda_G + \Delta\lambda_G/2$ where $\lambda_G$ is the principal emission wavelength of the green phosphor and $\Delta\lambda_G$ is its FWHM (full-width at half maximum); and $I(\lambda_n) \times T^R(\lambda_n)$ is normally at most 0.001, preferably at most 0.0005 in a wavelength region of $\lambda_B - \Delta\lambda_B/2 < \lambda_n < \lambda_B + \Delta\lambda_B/2$ where $\lambda_B$ is the principal emission wavelength of the blue phosphor and $\Delta\lambda_B$ is its FWHM ($I(\lambda_n)$ is the relative emission intensity, normalized by the total emission intensity from the backlight, at a wavelength $\lambda_n$ and $T^R(\lambda_n)$ is the spectral transmittance of the red color filter at a wavelength $\lambda_n$). In addition, $I(\lambda_R) \times T^R(\lambda_R)$ is normally at most 0.9, preferably at most 0.8. $I(\lambda_n) \times T^R(\lambda_n)$ is normally at least $1 \times 10^{-8}$ in the wavelength region of $\lambda_G - \Delta\lambda_G/2 < \lambda_n < \lambda_G + \Delta\lambda_G/2$. $I(\lambda_n) \times T^R(\lambda_n)$ is normally at least $1 \times 10^{-8}$ in the wavelength region of $\lambda_B - \Delta\lambda_B/2 < \lambda_n < \lambda_B + \Delta\lambda_B/2$.

Likewise, for the green pixels, a colorant is preferably selected to satisfy the following conditions: the product of the emission intensity $I(\lambda_G)$ normalized by the total emission intensity from the backlight and the spectral transmittance $T^G(\lambda_G)$ of the green color filter at the principal emission wavelength $\lambda_G$ of the green phosphor, i.e., $I(\lambda_G) \times T^G(\lambda_G)$ is at least 0.01, preferably at least 0.015; and $I(\lambda_n) \times T^G(\lambda_n)$ is normally at most 0.01, preferably at most 0.005 in a wavelength region of $\lambda_R - \Delta\lambda_R/2 < \lambda_n < \lambda_R + \Delta\lambda_R/2$; and $I(\lambda_n) \times T^G(\lambda_n)$ is normally at most 0.001, preferably at most 0.0001 in a wavelength region of $\lambda_B - \Delta\lambda_B/2 < \lambda_n < \lambda_B + \Delta\lambda_B/2$ ($T^G(\lambda_n)$ is the spectral transmittance of the green color filter at a wavelength $\lambda_n$). In addition, $I(\lambda_G) \times T^G(\lambda_G)$ is normally at most 0.9, preferably at most 0.8. $I(\lambda_n)_{\times T}{}^G(\lambda_n)$ is normally at least $1 \times 10^{-8}$ in the wavelength region of $\lambda_R - \Delta\lambda_R/2 < \lambda_n < \lambda_R + \Delta\lambda_R/2$. $I(\lambda_n) \times T^G(\lambda_n)$ is normally at least $1 \times 10^{-8}$ in the wavelength region of $\lambda_B - \Delta\lambda_B/2 < \lambda_n < \lambda_B + \Delta\lambda_B/2$.

The above-mentioned conditions (1) to (3) can be satisfied by selecting such a colorant for the green pixels.

Likewise, for the blue pixels, a colorant is preferably selected to satisfy the following conditions: the product of the emission intensity $I(\lambda_B)$ normalized by the total emission intensity from the backlight and the spectral transmittance $T^B(\lambda_B)$ of the blue color filter at the principal emission wavelength $\lambda_B$ of the blue phosphor, i.e., $I(\lambda_B) \times T^B(\lambda_B)$ is normally at least 0.01, preferably at least 0.015; and $I(\lambda_n) \times T^B(\lambda_n)$ is normally at most 0.0001 in a wavelength region of $\lambda_R - \Delta\lambda_R/2 < \lambda_n < \lambda_R + \Delta\lambda_R/2$; and $I(\lambda_n) \times T^B(\lambda_n)$ is normally at most 0.03, preferably at most 0.02 in a wavelength region of $\lambda_G - \Delta\lambda_G/2 < \lambda_n < \lambda_G + \Delta\lambda_G/2$ ($T^B(\lambda_n)$ is the spectral transmittance of the blue color filter at a wavelength $\lambda_n$). In addition, $I(\lambda_B) \times T^B(\lambda_B)$ is normally at most 0.9, preferably at most 0.8. $I(\lambda_n) \times T^B(\lambda_n)$ is normally at least $1 \times 10^{-8}$ in the wavelength region of $\lambda_R - \Delta\lambda_R/2 < \lambda_n < \lambda_R + \Delta\lambda_R/2$. $I(\lambda_n) \times T_B(\lambda_n)$ is normally at least $1 \times 10^{-8}$ in the wavelength region of $\lambda_G - \Delta\lambda_G/2 < \lambda_n < \lambda_G + \Delta\lambda_G/2$.

In the second invention of the present application, the colorants are selected as follows. For the red pixels, a colorant is selected to satisfy the following conditions: the product of the relative emission intensity $I(\lambda_R)$ normalized by the total emission intensity from the backlight and the spectral transmittance $T^R(\lambda_R)$ of the red color filter at the principal emission wavelength $\lambda_R$ of the red phosphor, i.e., $I(\lambda_R) \times T^R(\lambda_R) \geq 0.01$, preferably $I(\lambda_R) \times T^R(\lambda_R) > 0.05$; and at $\lambda = 585$ nm $I(\lambda_n) \times T^R(\lambda_n) < 0.007$, preferably $I(\lambda_n) \times T^R(\lambda_n) \leq 0.005$ to efficiently cut the sub-emission at the wavelength of 585 nm from the Tb type phosphor usually used as a green phosphor. In addition, $I(\lambda_R)$ is normally in a range of from 0.01 to 0.9, preferably from 0.01 to 0.2, $T^R(\lambda_R)$ is in a range of from 0.6 to 0.99, and it is preferred that $T^R(\lambda_n)/T^R(585) > 8$, particularly $T^R(\lambda_n)/T^R(585) > 10$ in a wavelength region of from 615 nm to 700 nm. Furthermore, $I(\lambda_R) \times T^R(\lambda_R)$ is normally at most 0.9, preferably at most 0.8. Normally, $1 \times 10^{-8} < I(\lambda_n) \times T^R(\lambda_n)$ at $\lambda = 585$ nm.

Furthermore, a colorant is preferably selected to satisfy the following conditions: $I(\lambda_n) \times T^R(\lambda_n)$ is normally at most 0.005, preferably at most 0.001 in a wavelength region of $\lambda_G - \Delta\lambda_G/2 < \lambda_n < \lambda_G + \Delta\lambda_G/2$ where $\lambda_G$ is the principal emission wavelength of the green phosphor and $\Delta\lambda_G$ is its FWHM; and $I(\lambda_n) \times T^R(\lambda_n)$ is normally at most 0.005, preferably at most 0.001 in a wavelength region of $\lambda_B - \Delta\lambda_B/2 < \lambda_n < \lambda_B + \Delta\lambda_B/2$ where $\lambda_B$ is the principal emission wavelength of the blue phosphor and $\Delta\lambda_B$ is its FWHM ($I(\lambda_n)$ is the relative emission intensity, normalized by the total emission intensity from the backlight, at a wavelength $\lambda_n$ and $T^R(\lambda_n)$ is the spectral transmittance of the red color filter at a wavelength $\lambda_n$). In addition, $I(\lambda_n) \times T^R(\lambda_n)$ is normally at least $1 \times 10^{-8}$ in the wavelength region of $\lambda_G - \Delta\lambda_G/2 < \lambda_n < \lambda_G + \Delta\lambda_G/2$. $I(\lambda_n) \times T^R(\lambda_n)$ is normally at least $1 \times 10^{-8}$ in the wavelength region of $\lambda_B - \Delta\lambda_B/2 < \lambda_n$; $< \lambda_B + \Delta\lambda_B/2$.

Likewise, for the green pixels, a colorant is preferably selected to satisfy the following conditions: the product of the emission intensity $I(\lambda_G)$ normalized by the total emission intensity from the backlight and the spectral transmittance $T^G(\lambda_G)$ of the green color filter at the principal emission wavelength $\lambda_G$ of the green phosphor, i.e., $I(\lambda_G) \times T^G(\lambda_G)$ is normally at least 0.01, preferably at least 0.015; and $I(\lambda_n) \times T^G(\lambda_n)$ is normally at most 0.01, preferably at most 0.005 in a wavelength region of $\lambda_R - \Delta\lambda_R/2 < \lambda_n < \lambda_R + \Delta\lambda_R/2$; and $I(\lambda_n) \times T^G(\lambda_n)$ is normally at most 0.005, preferably at most 0.001 in a wavelength region of $\lambda_B - \Delta\lambda_B/2 < \Delta_n < \lambda_B + \Delta\lambda_B/2$ ($T^G(\lambda_n)$ is the spectral transmittance of the green color filter at a wavelength $\lambda_n$). In addition, $I(\lambda_G) \times T^G(\lambda_G)$ is normally at most 0.9, preferably at most 0.8. $I(\lambda_n) \times T^G(\lambda_n)$ is normally at least $1 \times 10^{-8}$ in the wavelength region of $\lambda_R - \Delta\lambda_R/2 < \lambda_n < \lambda_R + \Delta\lambda_R/2$. $I(\lambda_n) \times T^G(\lambda_n)$ is normally at least $1 \times 10^{-8}$ in the wavelength region of $\lambda_B - \Delta\lambda_B/2 < \lambda_n < \lambda_B + \Delta\lambda_B/2$.

The above-mentioned conditions (1) to (3) of the first invention can be satisfied by selecting such a colorant for the green pixels.

Likewise, for the blue pixels, it is preferable to select a colorant similar to that in the first invention.

There are no particular restrictions on the colorants to be used in the present invention, and they are optionally selected so as to satisfy the above conditions. The colorants may be organic pigments, inorganic pigments, dyes, natural coloring matters, etc. and the organic pigments are preferred from the viewpoint of heat resistance and light resistance. It is also possible to use these pigments in combination of two or more, if the case demands.

The pigments to be used can be the organic pigments, such as azo type, phthalocyanine type, quinacridone type, benzimidazolone type, isoindoline type, dioxazine type, indanthrone type, perylene type and diketopyrrolopyrol type pigments, and, in addition thereto, various inorganic pigments.

Specifically, pigments having pigment numbers as listed below can be used, for example. Here, the term "C. I. pigment red 2" or the like below means a color index (C. I.).

Red colorant: C. I. pigment red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270 271, 272, 273, 274, 275, 276

Blue colorant: C. I. pigment blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79

Green colorant: C. I. pigment green 1, 2, 4, 7, 8, 10 13, 14, 15, 17, 18, 19, 26, 36, 45, 48, 50, 51, 54, 55

Yellow colorant: C. I. pigment yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208, Orange colorant: C. I. pigment orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79

Violet colorant: C. I. pigment violet 1, 1:1, 2, 2:2, 3, 3:1, 3, 3:3, 5, 5:1, 14, 15, 16, 19, 23, 25, 27, 29, 31, 32, 37, 39, 42, 44, 47, 49, 50

Brown colorant: C. I. pigment brown 1, 6, 11, 22, 23, 24, 25, 27, 29, 30, 31, 33, 34, 35, 37, 39, 40, 41, 42, 43, 44, 45, Black colorant: C. I. pigment black 1, 31, 32

Other colorants can be, of course, used.

The dyes may be azo type dyes, anthraquinone type dyes, phthalocyanine type dyes, quinoneimine type dyes, quinoline type dyes, nitro type dyes, carbonyl type dyes, methine type dyes, and so on.

The azo type dyes may be, for example, C. I. Acid Yellow 11, C. I. Acid Orange 7, C. I. Acid Red 37, C. I. Acid Red 180, C. I. Acid Blue 29, C. I. Direct Red 28, C. I. Direct Red 83, C. I. Direct Yellow 12, C. I. Direct Orange 26, C. I. Direct Green 28, C. I. Direct Green 59, C. I. Reactive Yellow 2, C. I. Reactive Red 17, C. I. Reactive Red 120, C. I. Reactive Black 5, C. I. Disperse Orange 5, C. I. Disperse Red 58, C. I. Disperse Blue 165, C. I. Basic Blue 41, C. I. Basic Red 18, C. I. Mordant Red 7, C. I. Mordant Yellow 5, C. I. Mordant Black 7, and so on.

The anthraquinone type dyes may be, for example, C. I. Vat Blue 4, C. I. Acid Blue 40, C. I. Acid Green 25, C. I. Reactive Blue 19, C. I. Reactive Blue 49, C. I. Disperse Red 60, C. I. Disperse Blue 56, C. I. Disperse Blue 60, and so on.

In addition, the phthalocyanine type dyes may be, for example, C. I. Pad Blue 5 and the like; the quinoneimine type dyes may be, for example, C. I. Basic Blue 3, C. I. Basic Blue 9, and so on; the quinoline type dyes may be, for example, C. I. Solvent Yellow 33, C. I. Acid Yellow 3, C. I. Disperse Yellow 64, and so on; and the nitro type dyes may be, for example, C. I. Acid Yellow 1, C. I. Acid Orange 3, C. I. Disperse Yellow 42, and so on.

Other colorants usable in the composition for a color filter may be inorganic colorants such as barium sulfate, lead sulfate, titanium oxide, yellow lead oxide, red iron oxide, chromium oxide and carbon black.

It is preferable to use an isoindolinone type pigment, particularly preferably P. Y. 139 among others, as a pigment for forming the green pixels of the color liquid crystal display device in the first invention of the present application.

These colorants are preferably used as dispersed in an average particle size of at most 1 $\mu$m, preferably at most 0.5 $\mu$m, and more preferably at most 0.25 $\mu$m.

The content of these colorants is normally in a range of from 5 to 60% by weight, preferably from 10 to 50% by weight to the total solid content of the composition for a color filter.

(e) Other Components

The composition for a color filter can be doped with a thermal polymerization inhibitor, a plasticizer, a storage stabilizer, a surface protecting agent, a smoothing agent, a coating property-assisting agent, and any other additive, if the case demands.

The thermal polymerization inhibitor to be used may be, for example, hydroquinone, p-methoxyphenol, pyrogallol, catechol, 2,6-t-butyl-p-cresol, β-naphthol, or the like. The compounding rate of the thermal polymerization inhibitor is preferably in a range of from 0 to 3% by weight to the total solid content of the composition.

The plasticizer to be used may be, for example, dioctyl phthalate, didodecyl phthalate, triethylene glycol dicaprylate, dimethyl glycol phthalate, tricresyl phosphate, dioctyl adipate, dibutyl sebacate, glycerol triacetate, or the like. The compounding rate of the plasticizer is preferably in a range of at most 10% by weight to the total solid content of the composition.

Furthermore, for a purpose of improving the sensitivity, a sensitizing dye according to a wavelength of an image exposure light source can be mixed in the composition for a color filter, if the case demands.

Examples of the sensitizing dye include xanthane dyes as described in JP-A-04-221958 and JP-A-04-219756, coumarin dyes having a heterocyclic ring as described in JP-A-03-239703 and JP-A-05-289335, 3-ketocoumarin compounds as described in JP-A-03-239703 and JP-A-05-289335, pyrromethene dyes as described in JP-A-06-19240, and dyes having a dialkyl aminobenzene skeleton as described in JP-A-47-2528, JP-A-54-155292, JP-B-45-37377, JP-A-48-84183, JP-A-52-112681, JP-A-58-15503, JP-A-60-88005, JP-A-59-56403, JP-A-O$_2$-69, JP-A-57-168088, JP-A-05-107761, JP-A-05-210240, and JP-A-04-288818.

Among these sensitizing dyes, preferred is an amino group-containing sensitizing dye, and more preferred is a compound having an amino group and a phenyl group in the same molecule. Particularly preferred is, for example, a benzophenone type compound such as 4,4'-bis(dimethylamino)benzophenone, 4,4'-bis(diethylamino)benzophenone, 2-aminobenzophenone, 4-aminobenzophenone, 4,4'-diaminobenzophenone, 3,3'-diaminobenzophenone or 3,4-diaminobenzophenone; a p-dialkylaminophenyl group-containing compound such as 2-(p-dimethylaminophenyl) benzoxazole, 2-(p-diethylaminophenyl) benzoxazole, 2-(p-dimethylaminophenyl) benzo[4,5] benzoxazole, 2-(p-dimethylaminophenyl) benzo[6,7] benzoxazole, 2,5-bis(p-diethylaminophenyl)1,3,4-oxazole, 2-(p-dimethylaminophenyl) benzothiazole, 2-(p-diethylaminophenyl) benzothiazole, 2-(p-dimethylaminophenyl) benzimidazole, 2-(p-diethylaminophenyl) benzimidazole, 2,5-bis(p-diethylaminophenyl)1,3,4-thiadiazole, (p-dimethylaminophenyl) pyridine, (p-diethylaminophenyl) pyridine, (p-dimethylaminophenyl) quinoline, (p-diethylaminophenyl) quinoline, (p-dimethylaminophenyl) pyrimidine or (p-diethylaminophenyl) pyrimidine; or the like. Among them, most preferred is 4,4'-dialkylaminobezophenone.

The compounding rate of the sensitizing dye is normally in a range of from 0 to 20% by weight, preferably from 0.2 to 15% by weight, and more preferably from 0.5 to 10% by weight to the total solid content of the composition for a color filter.

The composition for a color filter can be optionally further doped with an adhesion-improving agent, a coating property-improving agent, a development-improving agent, and so on.

The composition for a color filter may be used as dissolved in a solvent, in order to control the viscosity and to dissolve the additives of the photopolymerization initiation system and others.

The solvent can be optionally selected in accordance with the components of the composition such as (a) the binder resin, (b) the monomer, etc. and the solvent may be, for example, diisopropyl ether, mineral spirit, n-pentane, amyl ether, ethyl caprylate, n-hexane, diethyl ether, isoprene, ethyl isobutyl ether, butyl stearate, n-octane, Varsol #2, Apco #18 solvent, diisobutylene, amyl acetate, butyl acetate, Apco thinner, butyl ether, diisobutyl ketone, methyl cyclohexane, methyl nonyl ketone, propyl ether, dodecane, Socal solvent No. 1 and No. 2, amyl formate, dihexyl ether, diisopropyl ketone, Solveso #150, (n, sec, t)-butyl acetate, hexene, Shell TS28 solvent, butyl chloride, ethyl amyl ketone, ethyl benzoate, amyl chloride, ethylene glycol diethyl ether, ethyl orthoformate, methoxymethylpentanone, methyl butyl ketone, methyl hexyl ketone, methyl isobutyrate, benzonitrile, ethyl propionate, methyl cellosolve acetate, methyl isoamyl ketone, methyl isobutyl ketone, propyl acetate, amyl acetate, amyl formate, bicyclohexyl, diethylene glycol monoethyl ether acetate, dipentene, methoxymethylpentanol, methyl amyl ketone, methyl isopropyl ketone, propyl propionate, propylene glycol-t-butyl ether, methyl ethyl ketone, methyl cellosolve, ethyl cellosolve, ethyl cellosolve acetate, carbitol, cyclohexanone, ethyl acetate, propylene glycol, propylene glycol monomethyl ether, propylene glycol monomethyl ether acetate, propylene glycol monoethyl ether, propylene glycol monoethyl ether acetate, dipropylene glycol monoethyl ether, dipropylene glycol monomethyl ether, dipropylene glycol monomethyl ether acetate, 3-methoxypropionic acid, 3-ethoxypropionic acid, methyl 3-ethoxypropionate, ethyl 3-ethoxypropionate, methyl 3-methoxypropionate, ethyl 3-methoxypropionate, propyl 3-methoxypropionate, butyl 3-methoxypropionate, diglyme, ethylene glycol acetate, ethylcarbitol, butylcarbitol, ethylene glycol monobutyl ether, propylene glycol-t-butyl ether, 3-methyl-3-methoxybutanol, tripropylene glycol methyl ether, 3-methyl-3-methoxybutyl acetate, or the like. These solvents may be used in combination of two or more.

The solid content in the color composition for a color filter is selected in accordance with a coating method to be applied. In a spin coat, a slit and spin coat, and a die coat widely used in the production of the color filter at present, an appropriate solid content is normally in a range of from 1 to 40% by weight and preferably in a range of from 5 to 30% by weight.

A combination of solvents is determined taking a dispersion stability of a pigment, a solubility to soluble components in the solid contents, such as the resin, monomer and photopolymerization initiator, a drying property in coating, and a drying property in a reduced-pressure drying step into consideration.

A composition for a color filter using the above compounded components is produced, for example, as follows.

First, a colorant is subjected to a dispersion treatment and controlled into a state of ink. The dispersion treatment is conducted by means of a paint conditioner, a sand grinder, a ball mill, a roll mill, a stone mill, a jet mill, a homogenizer or the like. The colorant is brought into a state of fine particles by the dispersion treatment, thereby achieving an improvement in transmittance of transmitted light and an improvement in a coating property.

The dispersion treatment is preferably conducted in such a system that a binder resin having a dispersing function, a dispersing agent such as a surfactant, a dispersing assistance, etc. are optionally used together with the colorant and the solvent. It is particularly preferable to use a polymer dispersing agent, by virtue of its excellent dispersion stability over time.

For example, when the dispersion treatment is conducted by use of the sand grinder, it is preferred to use glass beads or zirconia beads having a particle size of from 0.1 to several millimeters. A temperature in the dispersion treatment is normally set in a range of from 0° C. to 100° C., preferably from room temperature to 80° C. A dispersing time is appropriately adjusted because an appropriate time for the dispersion treatment varies depending on the composition of ink (the colorant, the solvent and the dispersing agent), instrument specifications of the sand grinder, and so on.

Then the binder resin, monomer, photopolymerization initiation system, and others are mixed into the color ink obtained by the above dispersion treatment, to form a uniform solution. Since fine foreign particles are often mixed into the solution in each of the dispersion treatment step and the mixing step, the resulting solution is preferably filtered by means of a filter or the like.

A preferred composition for a color filter to be used for forming the green pixels of the color filter making up the color liquid crystal display device of the first invention of the present application is a photosensitive color resin composition comprising (a) a binder resin and/or (b) a monomer, (c) a photopolymerization initiation system and (d) a colorant, the resin composition comprising an isoindolinone type pigment as (d) the colorant, wherein the composition as a coating in a thickness of 2.5 $\mu$m shows an average transmittance of at least 20% and at most 80% at from 500 to 530 nm. Among isoindolinone type pigments, particularly preferably used is P. Y. 139. A method of measuring the average transmittance at from 500 to 530 nm for a coating of the composition for a color filter in a thickness of 2.5 $\mu$m is as follows. The composition for a color filter obtained by the above-mentioned method is applied onto a transparent substrate such as a glass substrate by a known method such as a spin coater, a bar coater or a die coater, and dried to obtain a coating in a dry film thickness of 2.5 $\mu$m. The entire surface of the substrate is exposed to ultraviolet rays of 100 mJ/cm$^2$, developed with an alkali developer, and post-baked at 230° C. in an oven for 30 minutes to form a sample for measurement. Using a commercially available spectrophotometer (for example, U-3500, U-4100, etc. manufactured by Hitachi, Ltd), the transmittance of the sample is measured as a relative value based on a reference (100%) of the spectral transmittance of a transparent substrate only preliminarily measured before the application step. The transmittances measured in such a manner were numerically averaged in a range of from 500 to 530 nm to determine an average transmittance. The photosensitive color resin composition as a coating in a thickness of 2.5 μm preferably shows an average transmittance of at least 30% and at most 70% at from 500 to 530 nm.

Method of Production of Color Filter

A color filter according to the present invention can be produced normally by forming red, green and blue pixel images on a transparent substrate provided with a black matrix.

There are no particular restrictions on the material of the transparent substrate. Specific examples of the material include thermoplastic resin sheets of polyesters such as polyethylene terephthalate, polyolefins such as polypropylene, polyethylene, etc., polycarbonate, polymethyl methacrylate, and polysulfone; heat curable plastic sheets of epoxy resins, unsaturated polyester resins, poly(meth)acrylate type resins, etc.; various glass sheets; or the like. Among these, preferred materials are the glass sheets and heat-resisting plastics in respect of heat resistance.

For an improvement in the physical properties including the adhesion property of the surface and others, the transparent substrate may be preliminarily treated by a corona discharge treatment, an ozone treatment, a thin film treatment with various polymers such as a silane coupling agent and a urethane polymer, and so on.

The black matrix is formed on the transparent substrate, utilizing a metal thin film or a pigment dispersion liquid for the black matrix.

The black matrix utilizing the metal thin film is formed, for example, of a single layer of chromium or two layers of chromium and a chromium oxide. In this case, first, a thin film or thin films of these metal or metal-metal oxide are formed on the transparent substrate by evaporation or sputtering or the like. Subsequently, a photosensitive film is formed thereon, and then the photosensitive film is exposed with a photomask having repeated patterns of stripes, a mosaic, triangles, or the like, and developed to form a resist image. Thereafter, the thin film is subjected to etching, thereby forming the black matrix.

Where the pigment dispersion liquid for the black matrix is utilized, the black matrix is formed using a composition for a color filter containing a black colorant as a colorant. For example, the black matrix is formed by using a single black colorant or a plurality of black colorants such as carbon black, bone black, graphite, iron black, aniline black, cyanine black, black titanium oxides, and so on, or using a composition for a color filter containing a black colorant made by mixture of red, green, blue, etc. properly selected from inorganic or organic pigments and dyes, and by employing a method similar to the below-described method of forming a red, green or blue pixel image.

The aforementioned composition for a color filter containing a colorant of one color out of red, green and blue is applied and dried on the transparent substrate with the black matrix thereon to form a coating, a photomask is placed on this coating, and the coating is subjected to image exposure through the photomask, development, and heat-curing or photo-curing according to need to form a pixel image, thereby preparing a color layer. This operation is carried out for each of the compositions for a color filter of three colors of red, green and blue, thereby forming a color filter image.

The application of the compositions for a color filter can be made by such applicators as a spinner, a wire bar, a flow coater, a die coater, a roll coater and a spray.

The drying after the application may be conducted with a hot plate, an IR oven, a convection oven, or the like. The higher the temperature of the drying, the better the adhesion to the transparent substrate. However, too high temperatures tend to decompose the photopolymerization initiation system, induce thermal polymerization, and result in development failure. Therefore, the drying temperature is normally selected in a range of from 50 to 200° C., preferably in a range of from 50 to 150° C. A drying time is normally selected in a range of from 10 seconds to 10 minutes, preferably in a range of from 30 seconds to 5 minutes. It is also possible to apply a drying method by depressurization, prior to these drying methods by heat.

The thickness of the coating after dried is normally in a range of from 0.5 to 3 μm, preferably in a range of from 1 to 2 μm.

In cases where the composition for a color filter used comprises a combination of a binder resin and an ethylenic compound and where the binder resin is an acrylic resin having an ethylenic double bond and a carboxyl group in its side chain, it has very high sensitivity and high resolving power and is thus preferable in that an image can be formed by exposure and development without provision of an oxygen shielding layer of polyvinyl alcohol or the like.

There are no particular restrictions on an exposure light source that can be applied to the image exposure; for example, applicable light sources include lamp light sources such as xenon lamps, halogen lamps, tungsten lamps, high-pressure mercury lamps, ultrahigh-pressure mercury lamps, metal halide lamps, middle-pressure mercury lamps, low-pressure mercury lamps, carbon arc lamps and fluorescent lamps, laser light sources such as argon ion lasers, YAG lasers, excimer lasers, nitrogen lasers, helium cadmium lasers and semiconductor lasers, and so on. For using only a specific wavelength, an optical filter can be used.

After completion of the image exposure with such a light source, the coating is developed with an aqueous solution containing an organic solvent or containing a surfactant and an alkaline chemical, thereby forming an image on the substrate. This aqueous solution may further contain an organic solvent, a buffer, a dye or a pigment.

There are no particular restrictions on a method of the development process; the development is conducted at a development temperature normally in a range of from 10 to 50° C., preferably in a range of from 15 to 45° C., and by such a method as dipping development, spray development, brush development, ultrasonic development, or the like.

Specific examples of the alkaline chemical to be used in the development include inorganic alkaline chemicals such as sodium silicate, potassium silicate, sodium hydroxide, potassium hydroxide, lithium hydroxide, sodium tertiary phosphate, sodium secondary phosphate, sodium carbonate, potassium carbonate, sodium bicarbonate, etc.; or organic amines such as trimethylamine, diethylamine, isopropyl amine, n-butylamine, monoethanolamine, diethanolamine, triethanolamine, tetraalkylammonium hydroxide, etc., which can be used alone or in combination of two or more.

Specific examples of the surfactant to be applicable include nonionic surfactants such as polyoxyethylene alkyl ethers, polyoxyethylene alkyl aryl ethers, polyoxyethylene alkyl esters, sorbitan alkyl esters, monoglyceride alkyl esters, etc.; anionic surfactants such as alkylbenzene-sulfonates, alkylnaphthalenesulfonates, alkylsulfates, alkylsulfonates, sulfosuccinates, etc.; amphoteric surfactants such as alkylbetaines, amino acids, and so on.

In either of the cases of the organic solvent being used alone and in combination with an aqueous solution, the organic solvent can be selected, for example, from isopropyl alcohol, benzyl alcohol, ethyl cellosolve, butyl cellosolve, phenyl cellosolve, propylene glycol, diacetone alcohol, and so on.

According to the first invention of the present application, where $T^G(\lambda_n)$ represents a spectral transmittance at a wavelength $\lambda$ nm (a wavelength at every 5 nm in the visible light region of from 380 to 780 nm) by the green pixels of the color filter produced as described above and $I(\lambda_n)$ a relative emission intensity, normalized by a total emission intensity, at a wavelength $\lambda_n$ nm from the backlight, the spectral transmittance $T^G(\lambda_n)$ and the relative emission intensity $I(\lambda_n)$ satisfy the following conditions:

(1) at one wavelength in 500 nm<$\lambda_n$<530 nm, $I(\lambda_n) \times T^G(\lambda_n) > 0.01$;

(2) in a wavelength region of 610 nm<$\lambda_n$<650 nm, $I(\lambda_n) \times T^G(\lambda_n) < 0.0001$;

(3) in a wavelength region of 400 nm<$\lambda_n$<450 nm, $I(\lambda_n) \times T^G(\lambda_n) < 0.0001$;

preferably, a phosphor layer or a phosphor film of the backlight is one comprising a compound represented by the following general formula (4):

$$M''_{1-x}Eu_xO \cdot a(Mg_{1-y}Mn_y)O \cdot bAl_2O_3 \quad (4)$$

(where $M''$ represents at least one atomic element selected from the group consisting of Ba, Sr and Ca, and a, b, x and y real numbers satisfying the following inequalities:

$0.8 \leq a \leq 1.2$;
$4.5 \leq b \leq 5.5$;
$0.05 \leq x \leq 0.3$; and
$0.02 \leq y < 0.5$);

whereby it is feasible to realize a color liquid crystal display device with ultrahigh chromatic purity of NTSC percentage of at least 80%, yet at least 90%, or even at least 95%.

According to the second invention, where $T^R(\lambda_n)$ represents a spectral transmittance at a wavelength $\lambda_n$ nm (a wavelength at every 5 nm in the visible light region) by the red pixels of the color filter produced as described above and $I(\lambda_n)$ a relative emission intensity, normalized by a total emission intensity, at a wavelength $\lambda_n$ nm from the backlight, the spectral transmittance $T^R(\lambda_n)$ and the relative emission intensity $I(\lambda_n)$ satisfy the following conditions:

(5) at one wavelength in 615 nm$\leq \lambda n \leq$700 nm, $I(\lambda_n) \times T^R(\lambda_n) \geq 0.01$;

(6) at $\lambda_n$=585 nm, $I(\lambda_n) \times T^R(\lambda_n) < 0.001$;

preferably, the following condition is further satisfied:

(7) at one wavelength in 615 nm$\leq \lambda_n \leq$650 nm, $T^R(\lambda_n)/T^R(585) > 8$;

preferably, the backlight comprises a phosphor layer or a phosphor film comprising one or two or more selected from the group consisting of $YVO_4:Eu^{3+}$ type phosphors, $Y(P,V)O_4:Eu^{3+}$ type phosphors and $3.5MgO \cdot 0.5MgF_2 \cdot GeO_2:Mn^{4+}$ type phosphors, or a GaAsP type LED; more preferably, the backlight comprises a phosphor layer or a phosphor film comprising one or two or more selected from the group consisting of $YVO_4:Eu^{3+}$ type phosphors, $Y(P,V)O_4:Eu^{3+}$ type phosphors and $3.5MgO \cdot 0.5MgF_2 \cdot GeO_2:Mn^{4+}$ type phosphors, or a GaAsP type LED; more preferably, the spectral transmittance $T^G(\lambda_n)$ at a wavelength $\lambda_n$ nm by the green pixels of the color filter and the relative emission intensity $I(\lambda_n)$, normalized by the total emission intensity, at a wavelength $\lambda_n$ nm from the backlight satisfy the aforementioned conditions (1) to (3) in the first invention; whereby it is feasible to realize a color liquid crystal display device with ultrahigh chromatic purity of NTSC percentage of at least 70% or even at least 80%.

EXAMPLES

The present invention will be more specifically described below with Preparation Examples, Examples, and Comparative Examples, but it is noted that the present invention is by no means intended to be limited to the examples below, without departing from the scope of the invention. In the examples below the term "parts" refers to "parts by weight."

Preparation Example 1

Preparation of Backlight ①

A phosphor slurry was prepared by thoroughly mixing 52 parts of $Y_2O_3$:Eu (trade name "LP-RE1" manufactured by KASEI OPTONIX, LTD.) as a red phosphor, 18 parts of $BaMgAl_{10}O_{17}$:Eu,Mn (trade name "LP-G3" manufactured by KASEI OPTONIX, LTD.) in the composition of $Ba_{0.9}Eu_{0.1}O(Mg_{0.79}Mn_{0.21})O \cdot 5Al_2O_3$ as a green phosphor, and 30 parts of $BaMgAl_{10}O_{17}$:Eu (trade name "LP-B4" manufactured by KASEI OPTONIX, LTD.) as a blue phosphor with butyl acetate and nitrocellulose lacquer, applied and dried on an internal surface of a glass tube with a tube diameter of 2.3 mm, and then baked at 620° C. for five minutes. Thereafter, a cold-cathode tube for a backlight was fabricated by the ordinary procedure of attachment of electrodes, evacuation, Hg and gas introduction, sealing, and so on.

Then a cyclic polyolefin type resin sheet (trade name "ZEONOR" manufactured by ZEON CORPORATION) of wedge shape, which had the size of 289.6×216.8 mm and thicknesses varying along the direction of the short side between a maximum thickness of 2.0 mm and a minimum thickness of 0.6 mm, was used as a light guide, a linear light source comprised of the above-mentioned cold-cathode tube was placed along the thick long side, and the periphery of the cold-cathode tube was covered by a reflector ("silver reflector plate" manufactured by Mitsui Chemicals, Inc.) with an Ag deposited film as a light reflecting surface, so as to allow emitted light from the linear light source to efficiently enter the thick side (light entrance surface) of the light guide.

The surface opposite to the light exit surface of the light guide was patterned by transferring fine circular patterns of rough surfaces with gradually increasing diameter according to the distance from the linear light source, from a die to the surface. The diameter of the rough surface patterns was 130 $\mu$m near the light source, gradually increased with distance from the light source, and was 230 $\mu$m at the most distant position.

The die used in the formation of the fine circular patterns of the rough surfaces herein was prepared by laminating a dry film resist in a thickness of 50 $\mu$m on a SUS substrate, forming openings in portions corresponding to the patterns by photolithography, further subjecting the die to uniform blasting under a projection pressure of 0.3 MPa with spherical glass beads of #600 by a sandblasting method, and thereafter peeling the dry film resist off.

The light exit surface of the light guide was provided with a triangular prism array with the apex angle of 90° and the pitch of 50 μm so that the ridge lines were approximately perpendicular to the light entrance surface of the light guide, thus achieving a structure of enhancing a light collecting property of beams emitted from the light guide. A die used in the formation of the light collecting element array consisting of the triangular prism array was prepared by a process of cutting a stainless steel substrate overlaid with an M nickel coating by electroless plating, with a single-crystal diamond cutting tool.

Figure 5:
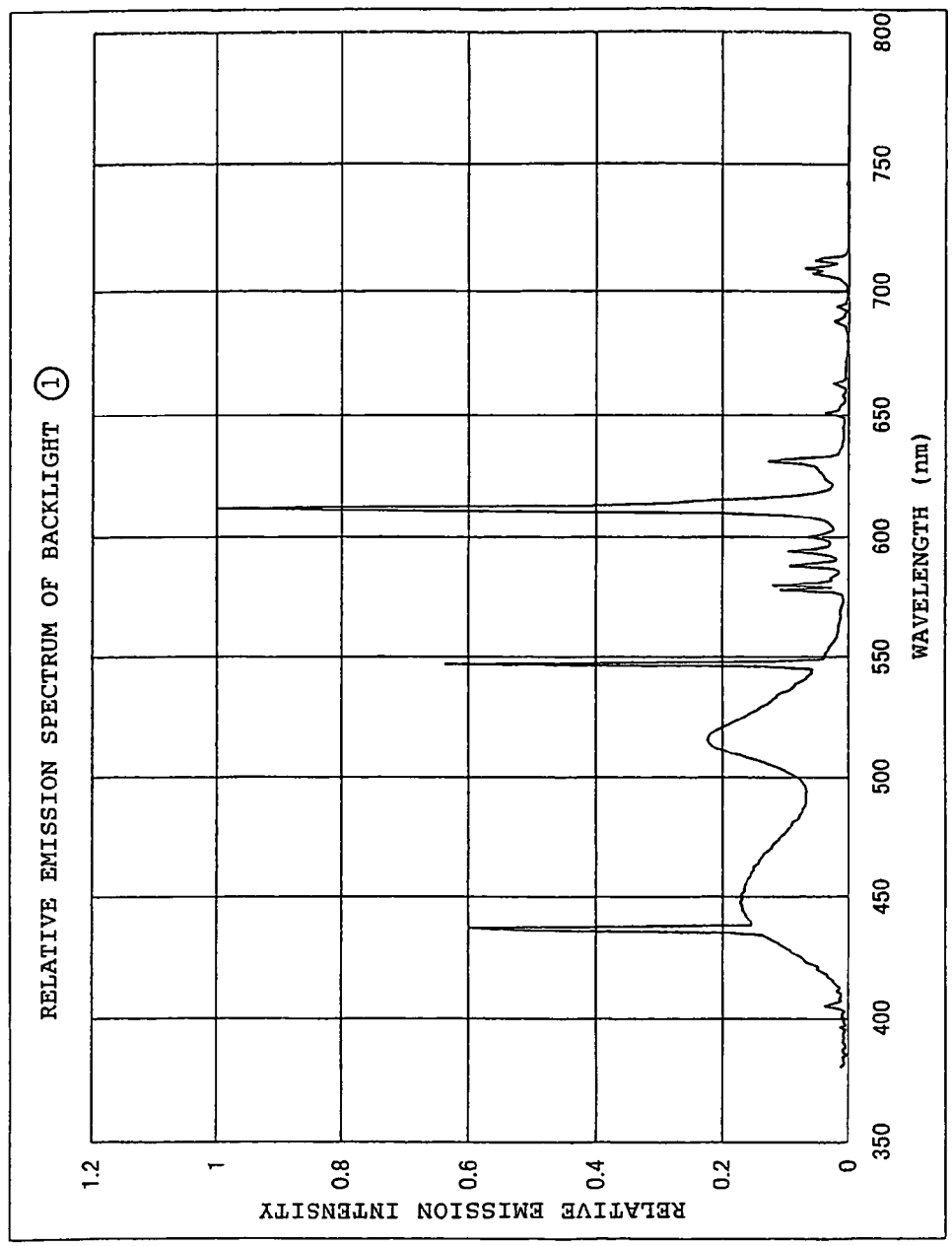
FIG. 5 is a relative emission spectrum of a backlight obtained in Preparation Example 1.

A light reflecting sheet ("Lumirror E60L" manufactured by TORAY Industries, Inc.) was placed on the side opposite to the light exit surface of the light guide, a light diffuser sheet was placed on the light exit surface, and two sheets with a triangular prism array having the apex angle of 90° and the pitch of 50 pm ("BEFIII" manufactured by SUMITOMO 3M Limited) were placed on the light diffuser sheet so that the ridge lines of the respective two prism sheets became perpendicular to each other, thereby obtaining a backlight. A relative emission spectrum of the backlight thus obtained is presented in FIG. 5.

Preparation Example 2

Preparation of Backlight ②

Figure 6:
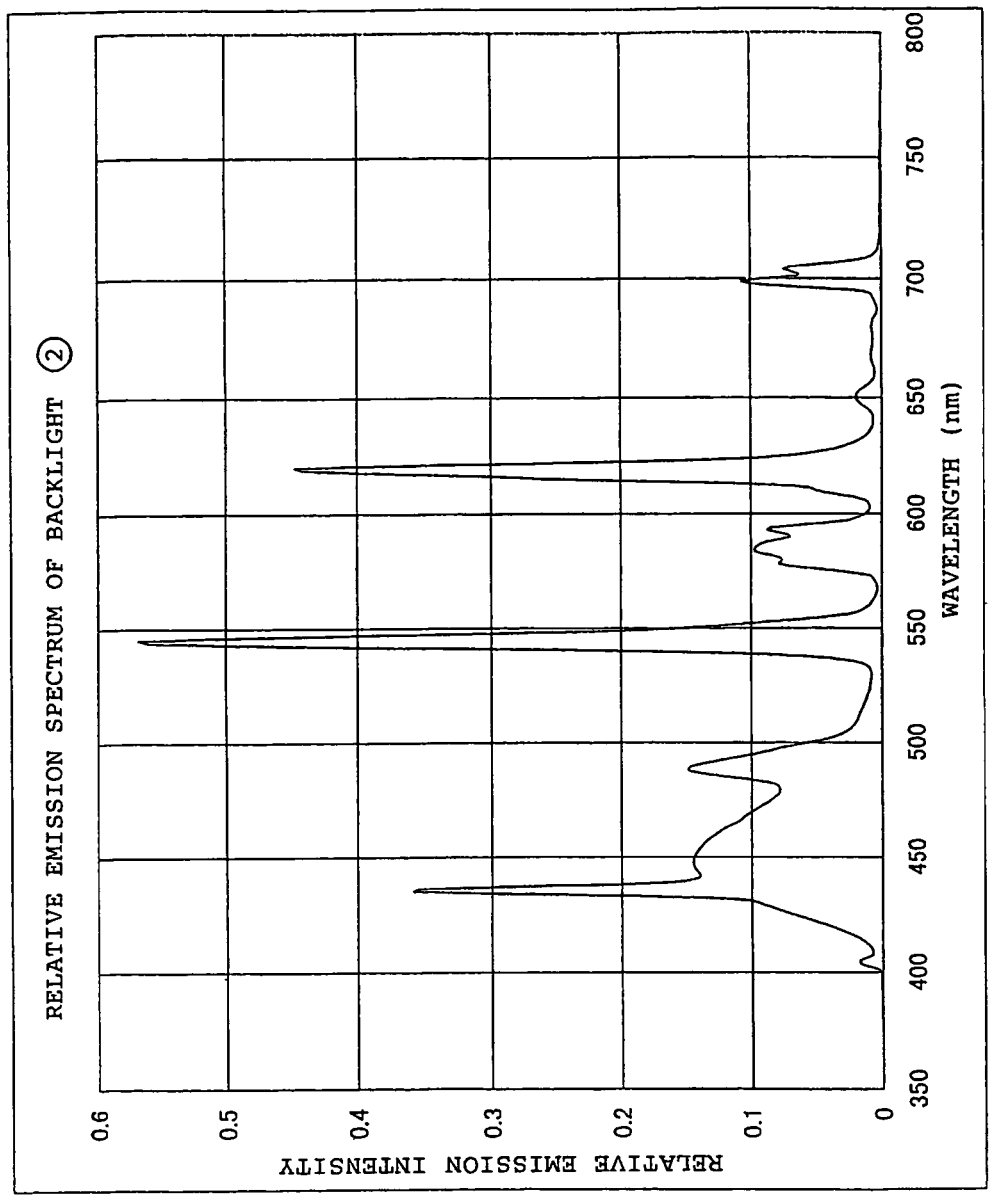
FIG. 6 is a relative emission spectrum of a backlight obtained in Preparation Example 2.

A cold-cathode tube for a backlight was fabricated in the same manner as in Preparation Example 1 except for use of 40 parts by weight of a $YVO_4:Eu^{3+}$ type phosphor (trade name "MGV-620" manufactured by KASEI OPTONIX, LTD.) as a red phosphor, 22 parts by weight of a $LaPO_4$:Ce,Tb phosphor (trade name "LP-G2" manufactured by KASEI OPTONIX, LTD.) as a green phosphor, and 38 parts by weight of $BaMgAl_{10}O_{17}$:Eu (trade name "LP-B4" manufactured by KASEI OPTONIX, LTD.) as a blue phosphor, and a. backlight ② was prepared therefrom in the same manner as in Preparation Example 1. A relative emission spectrum of the backlight thus obtained is presented in FIG. 6.

This backlight ② had the principal emission wavelengths of red: about 620 nm, blue: about 450 nm and green: about 545 nm.

Preparation Example 3

Preparation of Backlight ③

Figure 7:
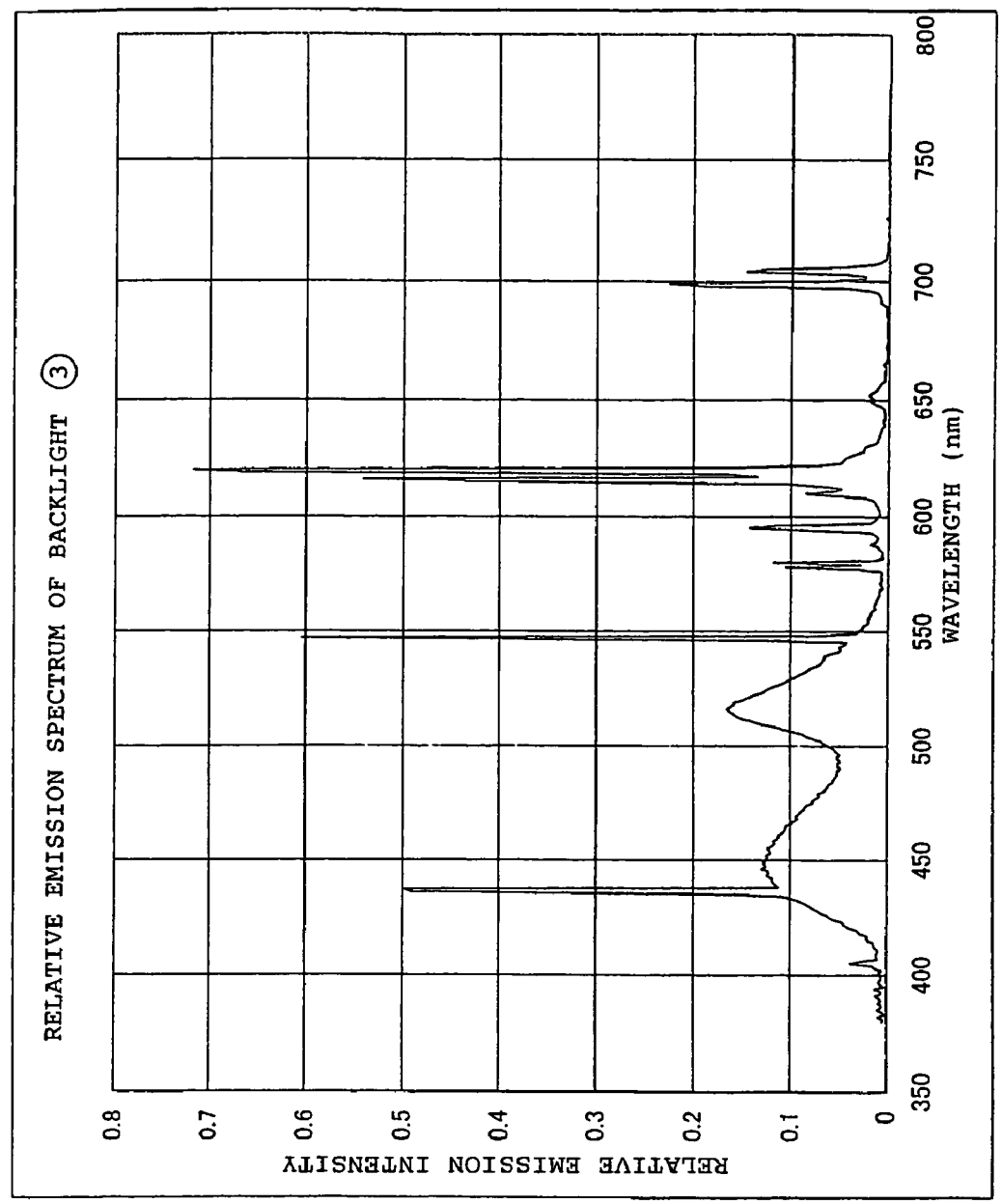
FIG. 7 is a relative emission spectrum of a backlight obtained in Preparation Example 3.

A cold-cathode tube for a backlight was fabricated in the same manner as in Preparation Example 1 except for use of 40 parts by weight of a $YVO_4:Eu^{3+}$ type phosphor (trade name "MGV-620" manufactured by KASEI OPTONIX, LTD.) as a red phosphor, 22 parts by weight of $BaMgAl_{10}O_{17}$:Eu,Mn (trade name "LP-G3" manufactured by KASEI OPTONIX, LTD.) in the composition of $Ba_{0.9}Eu_{0.1}O.(Mg_{0.79}Mn_{0.21})O.5Al_2O_3$ as a green phosphor, and 38 parts by weight of $BaMgAl_{10}O_{17}$:Eu (trade name "LP-B4" manufactured by KASEI OPTONIX, LTD.) as a blue phosphor, and a backlight ③ was prepared therefrom in the same manner as in Preparation Example 1. A relative emission spectrum of the backlight thus obtained is presented in FIG. 7.

This backlight ③ had the principal emission wavelengths of red: about 620 nm, blue: about 450 nm and green: about 515 nm.

Preparation Example 4

Preparation of Backlight ④

A cold-cathode tube for a backlight was fabricated in the same manner as in Preparation Example 1 except for use of a $LaPO_4$:Ce,Tb phosphor (trade name "LP-G2" manufactured by KASEI OPTONIX, LTD.) as a green phosphor, and a backlight was prepared in the same manner as in Preparation Example 1. A relative emission spectrum of the backlight thus obtained is presented in FIG. 3.

Preparation Example 5

Preparation of Binder Resin

A flask was charged with 20 parts of a styrene-acrylic acid resin having an acid value of 200 and a weight-average molecular weight of 5,000, 0.2 part of p-methoxyphenol, 0.2 part of dodecyltrimethylammonium chloride, and 40 parts of propylene glycol monomethyl ether acetate, and then 7.6 parts of (3,4-epoxycyclohexyl)methyl acrylate was dropwise added thereinto, followed by reaction at a temperature of 100° C. for 30 hours. The reaction solution was put into water to reprecipitate, and a reprecipitated product was dried to obtain a resin. A neutralization titration was conducted with KOH, and the acid value of the resin was found to be 80 mg-KOH/g.

Preparation Example 6

Preparation of Resist Solution

A resist solution was obtained by mixing components below at a rate below and stirring the components with a stirrer until the components were completely dissolved.

Binder resin solution prepared in Preparation EXAMPLE 5: 2.06 parts
Dipentaerythritol hexaacrylate: 0.21 part
Photopolymerization initiation system
2-(2'-chlorophenyl)-4,5-diphenylimidazole: 0.06 part
2-mercaptobenzothiazole: 0.02 part
4,4'-bis(diethylamino)benzophenone: 0.04 part
Solvent (propylene glycol monomethyl ether acetate): 5.41 parts
Surfactant ("FC-430" manufactured by SUMITOMO 3M Limited): 0.0003 part Preparation Example 7

Preparation of Red Pixel A 75 parts of propylene glycol monomethyl ether acetate, 17 parts of a red pigment P.R.254 and 8 parts of a urethane type dispersion resin were mixed and stirred with a stirrer for three hours to prepare a mill base in a solid content of 25% by weight. This mill base was subjected to a dispersion treatment at a peripheral velocity of 10 m/s and for a residence time of three hours with a bead mill system using 600 parts of 0.5-mmφ zirconia beads, thereby obtaining a P.R.254 dispersed ink.

Another mill base was prepared in the same composition as in the above P.R.254 case except for a change of the pigment to P.R.177, and was subjected to a dispersion treatment under similar dispersion conditions for a residence time of two hours, thereby obtaining a P.R.177 dispersed ink.

The dispersed inks obtained as described above were mixed and stirred at a ratio of 47 parts of the P.R.254 ink, 25 parts of the P.R.177 ink, and 28 parts of the resist solution prepared in Preparation Example 6, and a solvent (propylene glycol monomethyl ether acetate) was added thereto so as to achieve a final solid content of 25% by weight, thereby obtaining a composition for a red color filter.

The resultant composition for a color filter was applied and dried to a dry film thickness of 2.5 μm on a 10 cm×10 cm glass substrate ("AN635" manufactured by ASAHI GLASS CO., LTD.) with a spin coater. The entire surface of this substrate was exposed to ultraviolet light of 100 mJ/cm$^2$, development was carried out with an alkali developer, and the substrate was post-baked at 230° C. in an oven for 30 minutes, thereby preparing a red pixel sample for measurement.

Preparation Example 8

Preparation of Red Pixel B

A composition for a red color filter was made in the same manner as in Preparation Example 7 except for use of 25 parts of the P.R.254 ink and 17 parts of the P.R.177 ink as dispersed inks, and the application, drying, exposure to ultraviolet light, alkali development and post-baking were carried out similarly, thereby preparing a red pixel sample B for measurement.

Preparation Example 9

Preparation of Red Pixel C

A composition for a red color filter was made in the same manner as in Preparation Example 7 except for use of 42 parts of the P.R.254 ink and 12 parts of the P.R.177 ink as dispersed inks, and the application, drying, exposure to ultraviolet light, alkali development and post-baking were carried out similarly, thereby preparing a red pixel sample C for measurement.

Preparation Example10

Preparation of Green Pixel A

A mill base was prepared in the same composition as that of P.R.254 in Preparation Example 7 except for a change of the pigment to P.G.36, and was subjected to a dispersion treatment under similar dispersion conditions for a residence time of one hour, thereby obtaining a P.G.36 dispersed ink.

Another mill base was also prepared in the same composition as in Preparation Example 7 except for a change of the pigment to P.Y.150, and was subjected to a dispersion treatment under similar dispersion conditions for a residence time of two hours, thereby obtaining a P.Y.150 dispersed ink.

Still another mill base was prepared in the same composition as in Preparation Example 7 except for a change of the pigment to P.Y.139, and was subjected to a dispersion treatment under similar dispersion conditions for a residence time of two hours, thereby obtaining a P.Y.139 dispersed ink.

The dispersed inks obtained as described above were mixed and stirred at a ratio of 33.5 parts of the P.G.36 ink, 8.4 parts of the P.Y.150 ink, 9.0 parts of the P.Y.139 ink, and 66 parts of the resist solution prepared in above Preparation Example 6, and a solvent (propylene glycol monomethyl ether acetate) was added thereto so as to achieve a final solid content of 25% by weight, thereby obtaining a composition for a green color filter.

The resultant composition for a color filter was applied and dried to a dry film thickness of 2.5 μm on a 10 cm×10 cm glass substrate ("AN635" manufactured by ASAHI GLASS CO., LTD.) with a spin coater. The entire surface of this substrate was exposed to ultraviolet light of 100 mJ/cm$^2$, development was carried out with an alkali developer, and the substrate was post-baked at 230° C. in an oven for 30 minutes, thereby preparing a green pixel sample A for measurement.

Preparation Example 11

Preparation of Green Pixel B

A composition for a green color filter was made in the same manner as in Preparation Example 10 except for use of 20.0 parts of the P.G.36 ink and 6.9 parts of the P.Y.150 ink as dispersed inks, and the application, drying, exposure to ultraviolet, alkali development and post-baking were carried out similarly, thereby preparing a green pixel sample B for measurement.

Preparation Example 12

Preparation of Green Pixel C

A mill base was prepared in the same composition as that of P.R.254 in Preparation Example 7 except for a change of the pigment to P.Y.138, and was subjected to a dispersion treatment under similar dispersion conditions for a residence time of two hours, thereby obtaining a P.Y.138 dispersed ink.

A P.G.36 dispersed ink was prepared in the same manner as in Preparation Example 10.

A composition for a green color filter was prepared in the same manner as in Preparation Example 10 except for use of the dispersed inks obtained as described above, at a ratio of 22 parts of the P.G.36 ink and 20 parts of the P.Y.138 ink, and the application, drying, exposure to ultraviolet, alkali development and post-baking were carried out similarly, thereby preparing a green pixel sample C for measurement.

Preparation Example 13

Preparation of Blue Pixel A

A mill base was prepared in the same composition as that of P.R.254 in Preparation Example 7 except for a change of the pigment to P.G.15:6, and was subjected to a dispersion treatment under similar dispersion conditions for a residence time of one hour, thereby obtaining a P.G.15:6 dispersed ink.

Another mill base was prepared in the same composition as that of P.R.254 in Preparation Example 7 except for a change of the pigment to P.V.23, and was subjected to a dispersion treatment under similar dispersion conditions for a residence time of two hours, thereby obtaining a P.V.23 dispersed ink.

The dispersed inks obtained as described above were mixed and stirred at a ratio of 33.5 parts of the P.B.15:6 ink, 1.6 parts of the P.V.23 ink, and 65 parts of the resist solution prepared in above Preparation Example 6, and a solvent (propylene glycol monomethyl ether acetate) was added thereto so as to achieve a final solid content of 25% by weight, thereby obtaining a composition for a blue color filter.

The resultant composition for a color filter was applied and dried to a dry film thickness of 2.5 μm on a 10 cm×10 cm glass substrate ("AN635" manufactured by ASAHI GLASS CO., LTD.) with a spin coater. The entire surface of this substrate was exposed to ultraviolet light of 100 mJ/cm$^2$, development was carried out with an alkali developer, and the substrate was post-baked at 230° C. in an oven for 30 minutes, thereby preparing a blue pixel sample A for measurement.

Preparation Example 14

Preparation of Blue Pixel B

A composition for a blue color filter was made in the same manner as in Preparation Example 13 except for use of 14 parts of the P.B.15:6 ink and 2.5 parts of the P.V.23 ink as dispersed inks, and the application, drying, exposure to ultraviolet, alkali development and post-baking were carried out similarly, thereby preparing a blue pixel sample B for measurement.

Table 1, to an associated backlight high-frequency lit in a manner similar to the above, and the chromaticity and luminance of each combination were measured with a light luminance meter ("BM5A" manufactured by TOPCON CORPORATION) to be used as basic data.

These data are equivalent to those in a state of single color emission of red, green or blue in a liquid crystal display element as a combination of a pertinent backlight with a color filter except that the luminance is approximately one third in the actual display element, and, therefore, the color reproduction range (NTSC percentage) and luminance of the liquid crystal display element can be calculated using the data.

The results are presented in Table 1. In Table 1, ○ represents satisfying a formula, and x not satisfying a formula.

In Table 1, as the chromaticity of green, (x, y), approaches (0.21, 0.71), the purity of green becomes higher and green becomes deeper. It is seen in Examples 1 to 3 of the present application that the chromaticity (0.21, 0.71) was achieved and that the luminance is high (the image is bright).

An average transmittance in 500 to 530 nm of the green pixels A and B prepared in Preparation Examples 10 and 11 was calculated, and found to be 53.2% for the green pixel A and 83.9% for the green pixel B.

Coatings of the color-filter compositions of the respective colors prepared in Preparation Examples 7 to 14 above were exposed under 100 mJ/cm$^2$ with a test pattern mask and developed, and it was confirmed that all the samples yielded good patterns.

TABLE 1

| | Back-light | Color filter | | | Formulae | | | Chromaticity (x,y) | | | NTSC | Luminance |
| | | Red | Green | Blue | (1) | (2) | (3) | Red | Green | Blue | (%) | (unit) |
|---|---|---|---|---|---|---|---|---|---|---|---|---|
| Ex. 1 | ① | A | A | A | ○515 | ○ | ○ | (0.64, 0.33) | (0.21, 0.71) | (0.14, 0.08) | 95 | 244 |
| Ex. 2 | ③ | B | A | A | ○515 | ○ | ○ | (0.665, 0.327) | (0.21, 0.71) | (0.14, 0.08) | 100 | 235 |
| Ex. 3 | ① | A | A | B | ○515 | ○ | ○ | (0.64, 0.33) | (0.21, 0.71) | (0.15, 0.06) | 94 | 228 |
| Comp. Ex. 1 | ④ | A | A | A | X | ○ | ○ | (0.64, 0.33) | (0.30, 0.62) | (0.14, 0.05) | 75 | 102 |
| Comp. Ex. 2 | ① | A | B | A | ○515 | X | X | (0.64, 0.33) | (0.27, 0.62) | (0.14, 0.07) | 78 | 202 |
| Com. Ex. 3 | ④ | A | B | B | X | X | X | (0.64, 0.33) | (0.29, 0.60) | (0.15, 0.06) | 72 | 260 |

○515 means that the formula (1) is satisfied at 515 nm.

Examples 1 to 3 and Comparative Examples 1 to 3

The cold-cathode tubes of the backlights in Table 1 were high-frequency lit up through an inverter ("HIU-742A" manufactured by HARISON TOSHIBA LIGHTING Corp.) and emission spectra of the respective backlights were measured with "BM-5" manufactured by TOPCON CORPORATION.

For each of the red pixel samples, the green pixel samples and the blue pixel samples in Table 1, a transmission spectrum was measured with a spectrophotometer ("U-3500", manufactured by Hitachi, Ltd.).

Values of the aforementioned conditions (1) to (3) were calculated from these data.

A red pixel sample, a green pixel sample and a blue pixel sample each were attached in a combination of those in Examples 4 and 5 and Comparative Examples 4 and 5

The cold-cathode tubes of the backlights in Table 2 were high-frequency lit up through an inverter ("HIU-742A" manufactured by HARISON TOSHIBA LIGHTING Corp.) and emission spectra of the respective backlights were measured with "BM-5" manufactured by TOPCON CORPORATION.

For each of the red pixel samples, the green pixel samples and the blue pixel samples in Table 2, a transmission spectrum was measured with a spectrophotometer ("U-3500" manufactured by Hitachi, Ltd.).

Values of the aforementioned conditions (5) and (6) were calculated from these data.

It was confirmed in Example 4 that the condition (5) was satisfied at λ=620 nm and that the condition (6) and the condition (7) were also satisfied at X=620 nm.

TABLE 2

| | Back-light | Color filter | | | Formulae | | | Chromaticity | | | NTSC | Luminance |
|---|---|---|---|---|---|---|---|---|---|---|---|---|
| | | Red | Green | Blue | (5) | (6) | (7) | Red | Green | Blue | (%) | (unit) |
| Ex. 4 | ② | B | C | B | ○620 | ○ | ○ | (0.665, 0.327) | (0.29, 0.60) | (0.15, 0.06) | 77 | 309 |
| Ex. 5 | ③ | B | A | A | ○620 | ○ | ○ | (0.665, 0.327) | (0.21, 0.71) | (0.14, 0.08) | 100 | 235 |
| Comp. Ex. 4 | ④ | B | C | B | X | ○ | X | (0.64, 0.33) | (0.29, 0.60) | (0.15, 0.06) | 74 | 311 |
| Comp. Ex. 5 | ② | C | C | B | ○620 | X | X | (0.61, 0.32) | (0.29, 0.60) | (0.15, 0.06) | 67 | 350 |

○620 means that the formula (5) is satisfied at 620 nm.

$I(620)=8.23\times10^{-2}$ $T^R(620)=0.903$ $I(620)\times T^R(620)=7.43\times10^{-2}$ $I(585)=2.08\times10^{-2}$ $T^R(585)=7.87\times10^{-2}$ $I(585)\times T^R(585)=1.64\times10^{-3}$ $T^R(620)\div T^R(585)=11.5$ It was confirmed in Example 5 that the condition (5) was satisfied at λ=620 nm and that the condition (6) and the condition (7) were also satisfied at λ=620 nm.

$I(620)=6.55\times10^{-2}$ $T^R(620)=0.87$ $I(620)\times T^R(620)=5.70\times10^{-2}$ $I(585)=2.83\times10^{-3}$ $T_R(585)=5.34\times10^{-2}$ $I(585)\times T^R(585)=1.51\times10^{-4}$ $T^R(620)\div T^R(585)=16.3$ A red pixel sample, a green pixel sample and a blue pixel sample each were attached in a combination of those in Table 2, to an associated backlight high-frequency lit in a manner similar to the above, and the chromaticity and luminance of each combination were measured with a light luminance meter ("BM5A" manufactured by TOPCON CORPORATION) to be used as basic data.

These data are equivalent to those in a state of single color emission of red, green or blue in a liquid crystal display element as a combination of a pertinent backlight with a color filter except that the luminance is approximately one third in the actual display element, and, therefore, the color reproduction range (NTSC percentage) and luminance of the liquid crystal display element can be calculated using the data.

The results are presented in Table 2. In Table 2, ○ represents satisfying a formula, and x not satisfying a formula.

In Table 2, as the chromaticity of red, (x, y), approaches (0.67, 0.33), the purity of red becomes higher and red becomes deeper. It is seen in Examples 4 and 5 of the present application that the chromaticity was achieved at coordinates extremely close to the chromaticity (0.67, 0.33) and that the luminance is high (the image is bright).

INDUSTRIAL APPLICABILITY

As detailed above, a color liquid crystal display device of the present invention is a color liquid crystal display device comprising a combination of light shutters utilizing a liquid crystal, a color filter having color elements of at least three colors of red, green and blue corresponding to the light shutters, and a backlight for transmission illumination, wherein emission wavelengths of the backlight are improved and wherein a spectral transmittance of the color filter, particularly a spectral transmittance of the green pixels of the color filter, is adjusted corresponding to the emission wavelengths of the backlight, whereby the invention can readily provide a color liquid crystal display device achieving the high chromatic purity with high NTSC percentage.

The present invention was described in detail with the specific embodiments thereof, and it is obvious to those skilled in the art that the invention can be changed and modified in various ways, without departing from the spirit and scope of the present invention.

The present application is based on the Japanese Patent Application filed Aug. 30, 2002 (Patent Application No. 2002-254705) and the Japanese Patent Application filed Oct. 22, 2002 (Patent Application No. 2002-307300), the whole of which is incorporated herein by reference.

What is claimed is:

1. A color liquid crystal display device comprising a combination of light shutters utilizing a liquid crystal, a color filter having color elements of at least three colors of red, green and blue corresponding to the light shutters, and a backlight for transmission illumination, wherein, under the following definitions: $\lambda_n$ represents a wavelength at every interval of 5 nm in the visible light region of from 380 to 780 nm; $T^G(\lambda_n)$ a spectral transmittance at a wavelength $\lambda_n$ nm by a green pixel of the color filter; and $I(\lambda_n)$ a relative emission intensity, normalized by a total emission intensity, at a wavelength $\lambda_n$ nm from the backlight, the device satisfies following conditions (1) to (3):

(1) at one wavelength in 500 nm<$\lambda_n$<530 nm, $I(\lambda_n)\times T^G(\lambda_n)>0.01$;

(2) in a wavelength region of 610 nm<$\lambda_n$<650 nm, $I(\lambda_n)\times T^G(\lambda_n)<0.0001$;

(3) in a wavelength region of 400 nm<$\lambda_n$<450 nm, $$I(\lambda_n) \times T^G(\lambda_n) < 0.0001;$$

wherein $I(\lambda_n)$ is defined as follows:

$$S(\lambda_n) = \frac{\int_{\lambda_n-\Delta\lambda/2}^{\lambda_n+\Delta\lambda/2} s(\lambda)\,d\lambda}{\Delta\lambda}$$

$$I(\lambda_n) = \frac{s(\lambda_n)}{\sum_{\lambda=380}^{780} s(\lambda_n)}$$

where $S(\lambda)$ represents a measured value of emission intensity at a wavelength $\lambda$ from the backlight, and $\Delta\lambda$=5 nm.

2. The color liquid crystal display device according to claim 1, wherein the backlight comprises a phosphor layer or a phosphor film, said phosphor layer or said phosphor film comprising a compound represented by the following general formula (4):

$$M^{II}_{1-x}Eu_xO.a(Mg_{1-y}Mn_y)O.bAl_2O_3 \qquad (4)$$
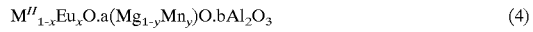

wherein $M^{II}$ represents at least one atomic element selected from the group consisting of Ba, Sr and Ca and a, b, x and y are real numbers satisfying the following inequalities:

$0.8 \leq a \leq 1.2$,
$4.5 \leq b \leq 5.5$,
$0.05 \leq x \leq 0.3$, and
$0.02 \leq y \leq 0.5$.

3. The color liquid crystal display device according to claim 1, wherein the backlight has at least one emission peak in a wavelength region of from 500 to 530 nm, wherein, where chromaticity points of red, green and blue pixels in the CIE XYZ calorimetric system are defined by $(x_R, y_R)$, $(x_G, y_G)$ and $(x_B, y_B)$, respectively, an area of a triangle surrounded by said three points on an x-y chromaticity diagram is at least 80% of an area surrounded by the three primary colors, red (0.67, 0.33), green (0.21, 0.71) and blue (0.14, 0.08), in the standard system defined by U.S. National Television System Committee (NTSC).

4. The color liquid crystal display device according to claim 1, wherein the green pixel is formed from a photosensitive color resin composition comprising (a) a binder resin and/or (b) a monomer, (c) a photopolymerization initiation system and (d) a colorant, wherein said resin composition comprises an isoindolinone type pigment as (d) the colorant, and wherein said resin composition as a coating in a thickness of 2.5 μm shows an average transmittance of at least 20% and at most 80% at from 500 to 530 nm.

5. A color liquid crystal display device comprising a combination of light shutters utilizing a liquid crystal, a color filter having color elements of at least three colors of red, green and blue corresponding to the light shutters, and a backlight for transmission illumination, wherein, under the following definitions: $T^R(\lambda_n)$ represents a spectral transmittance at a wavelength $\lambda_n$ nm by a red pixel of the color filter; and $I(\lambda_n)$ a relative emission intensity, normalized by a total emission intensity, at a wavelength $\lambda_n$ nm from the backlight, the device satisfies following conditions (5) and (6):

(5) at one wavelength in 615 nm$\leq \lambda_n \leq$700 nm, $$I(\lambda_n) \times T^R(\lambda_n) \geq 0.01;$$

(6) at $\lambda_n$=585 nm, $$I(\lambda_n) \times T^R(\lambda_k) < 0.007;$$

wherein $I(\lambda_n)$ is defined by the same definition as in claim 1.

6. The color liquid crystal display device according to claim 5, wherein at one wavelength in 615 nm$\leq \lambda_n \leq$700 nm, $T^R(\lambda_n)$ satisfies the following formula (7):

$$T^R(\lambda_n)/T^R(585) > 8. \qquad (7)$$

7. The color liquid crystal display device according to claim 5, wherein the backlight comprises a phosphor layer or a phosphor film, said phosphor layer or said phosphor film comprising one or two or more selected from the group consisting of YVO$_4$:Eu$^{3+}$ type phosphors, Y(P,V)O$_4$:Eu$^{3+}$ type phosphors, and 3.5MgO.0.5MgF$_2$.GeO$_2$:Mn$^{4+}$ type phosphors.

8. The color liquid crystal display device according to claim 5, wherein the backlight comprises an LED in structure thereof, said LED comprising a GaAsP type LED.

9. The color liquid crystal display device according to claim 5, wherein the backlight has at least one emission peak in a wavelength region of from 615 to 700 nm.

* * * * *